(12) United States Patent
Kagawa

(10) Patent No.: US 8,448,376 B2
(45) Date of Patent: May 28, 2013

(54) FLYING INSECT TRAPPING APPARATUS

(75) Inventor: Yoshitake Kagawa, Hatsukaichi (JP)

(73) Assignee: Fumakilla Limited, Hiroshima (JP)

( * ) Notice: Subject to any disclaimer, the term of this patent is extended or adjusted under 35 U.S.C. 154(b) by 61 days.

(21) Appl. No.: 12/599,864

(22) PCT Filed: May 2, 2008

(86) PCT No.: PCT/JP2008/058690
§ 371 (c)(1),
(2), (4) Date: Nov. 12, 2009

(87) PCT Pub. No.: WO2008/143041
PCT Pub. Date: Nov. 27, 2008

(65) Prior Publication Data
US 2010/0275505 A1 Nov. 4, 2010

(30) Foreign Application Priority Data

May 21, 2007 (JP) ................................. 2007-133748
Dec. 17, 2007 (JP) ................................. 2007-324632
Jan. 16, 2008 (JP) ................................. 2008-006886

(51) Int. Cl.
*A01M 1/02* (2006.01)
*A01M 1/10* (2006.01)
*A01M 1/20* (2006.01)

(52) U.S. Cl.
USPC .................................. 43/107; 43/131; 43/122

(58) Field of Classification Search
USPC .................... 43/107, 122, 114, 131
IPC ..................... A01M 1/20,1/10, 1/02
See application file for complete search history.

(56) References Cited

U.S. PATENT DOCUMENTS

| | | | |
|---|---|---|---|
| 1,666,509 A | | 4/1928 | Schlossareck |
| 4,121,372 A | * | 10/1978 | Landaus ........................ 43/122 |
| 4,400,903 A | * | 8/1983 | Seidenberger .................. 43/122 |

(Continued)

FOREIGN PATENT DOCUMENTS

| | | |
|---|---|---|
| EP | 0354875 A1 | 2/1990 |
| GB | 2283896 A | 5/1995 |

(Continued)

OTHER PUBLICATIONS

International Preliminary Report on Patentability and Written Opinion dated Jan. 21, 2010 (in English) issued in a counterpart International Application No. PCT/JP2008/058690.

(Continued)

*Primary Examiner* — Darren W Ark
*Assistant Examiner* — Kathleen Iwasaki
(74) *Attorney, Agent, or Firm* — Holtz, Holtz, Goodman & Chick, P.C.

(57) ABSTRACT

A flying insect trapping apparatus is provided that is capable of attracting and trapping flying insects such as flies or wasps very well and moreover without giving a user an unpleasant feeling. The flying insect trapping apparatus comprises an attractive and inductive member having a vertical surface portion, an entry port surrounding an upper part of the attractive and inductive member and a trap chamber communicating with the entry port, whereby a flying insect is attracted by the member and to land on the surface portion thereof and then is induced to move along the surface portion and to pass through said entry port so as to be trapped in the inside of the trap chamber.

10 Claims, 39 Drawing Sheets

U.S. PATENT DOCUMENTS

| | | | |
|---|---|---|---|
| 4,961,282 A | 10/1990 | Hoppe | |
| 4,986,024 A * | 1/1991 | Peek et al. | 43/107 |
| 5,231,792 A | 8/1993 | Warner | |
| 5,557,880 A * | 9/1996 | Schneidmiller | 43/122 |
| 6,393,760 B1 * | 5/2002 | Lingren | 43/122 |
| 7,093,389 B1 * | 8/2006 | Meier et al. | 43/107 |
| 7,150,125 B1 | 12/2006 | Mizell, III | |
| 7,412,797 B1 * | 8/2008 | Hiscox | 43/122 |
| 2006/0207164 A1 * | 9/2006 | Pearson | 43/132.1 |

FOREIGN PATENT DOCUMENTS

| | | |
|---|---|---|
| JP | 35156 | 4/1915 |
| JP | 50621 | 12/1919 |
| JP | 7876 | 4/1923 |
| JP | 02-086725 A | 3/1990 |
| JP | 2003-070403 A | 3/2003 |
| WO | WO 2005/043997 A1 | 5/2005 |

OTHER PUBLICATIONS

Extended European Search Report dated Jun. 24, 2010 (in English) issued in counterpart European Application No. 08752573.9.

* cited by examiner ated by the aerosol sprayer may come to adhere on food and
FLYING INSECT TRAPPING APPARATUS This application is a U.S. National Phase Application under 35 USC 371 of International Application PCT/JP2008/058690 filed May 2, 2008.

TECHNICAL FIELD

The present invention relates to a flying insect trapping apparatus or utensil used to trap flying insects such as flies or wasps.

BACKGROUND ART

To control or exterminate flying insects, e. g., a fly, it has been a general method to use an aerosol sprayer filled in its interior with an insecticide to spray the insecticide on the controllable fly.

However, the use of an aerosol sprayer to control a fly is likely to suffer various restrictions. For example, in the neighborhood of a kitchen with foods and tableware where many flies develop, there is the problem that an insecticide atomized by the aerosol sprayer may come to adhere on food and tableware. As a result, it has been the actual circumstances to desist from using such a sprayer there.

In substitution for such a method of atomizing an insecticide with an aerosol sprayer, the method of using a fly trapping ribbon, sheet or the like is conceivable whereby flies are stuck thereto. With the fly trapping ribbon, sheet or the like, however, the dead bodies of flies trapped by the adhesive remain lying open and give the user an unpleasant feeling during use, in addition, there is also the problem that with the adhesive exposed, the fly trapping ribbon or sheet is likely to come to stick to such as a hand or clothing of the user and its use has thus required the user to pay attention to it.

Accordingly, in lieu of the fly trapping ribbon, sheet or the like, a trapping utensil is now widespread. The trapping utensil or apparatus as described in JP 2003-70403 A has a spherical container which is provided at its upper and lower parts with a small and a large opening, respectively, through which flies and the like as harmful insects can enter and in which an attractant insecticide is received that functions to attract and kill an insecticide such as fly. And, a smell of the attractant insecticide received in the container is radiated through the upper small opening and the lower large opening into the outside so that induced by the smell, such as a fly is lead through the small or large opening into the container interior. And, such as a fly lead into the container interior comes to die therein by contacting with the attractant insecticide.

With the conventional trapping apparatus, however, there is the problem that if the smell of the attractant insecticide received in the container interior is made weak, it is not able to attract such as a fly at all and contrariwise if the attractant insecticide is made too strong in smell, then that smell comes to be scented by a human user and makes the user feel it offensive. The existing trapping apparatus also offers the problem that there is a limitation in attracting such as flies by a smell of attractant insecticide such that intensifying the smell fails to attract them well.

DISCLOSURE OF THE INVENTION

It is accordingly an object of the present invention to solve these problems and, to wit, to provide a flying insect, trapping apparatus or utensil that is capable of trapping flying insects such as flies or wasps well and moreover without giving an user an unpleasant feeling.

The present invention provides in a first aspect thereof a flying insect trapping apparatus characterized in that it comprises an attractive and inductive member having a vertical surface portion; an entry port surrounding an upper part of the attractive and inductive member; and a trap chamber communicating with the entry port, whereby a flying insect is attracted by the member to land on the said surface portion thereof and then is induced to move along the surface portion and to pass through the said entry port so as to be trapped in the inside of the said trap chamber.

According to the invention in the first aspect mentioned above, flying insects such as flies or wasps can be induced to land on the surface portion of the attractive and inductive member as a foothold and flying insects such flies or wasps which have landed can be guided by their negative geotaxis to move upwards on the attractive and inductive member and then to enter through the entry port above into the trap chamber whereby flying insects such as flies or wasps can be lured or attracted and trapped very well. Accordingly, markedly higher effect of trapping of flying insects such as flies or wasps can be achieved than in conventional methods of trapping flying insects such as flies by luring or attracting them with odors of an attractant insecticide or the like. Moreover, the use of an attractive and inductive member with no adhesive or the like attached thereto eliminates the problem that such as dead flies or the like remain exposed in use, thereby giving users no unpleasant feeling. The problem is also removed that the user's hand or clothing or the like may come to stick to the adhesive. The flying insect, trapping apparatus can thus be used very favorably.

In a second aspect thereof the present invention provides a flying insect trapping apparatus in the first aspect, which comprises a trap container formed in its inside with the trap chamber and provided in its lower part with the entry port and a pendant attractive plate having the vertical surface portion and suspended through the entry port of the trap container.

In a third aspect thereof the present invention provides a flying insect trapping apparatus in the second aspect, in which the pendant attractive plate is of a shape such that its upper side is in the form of a chevron or an arch which becomes narrower in width upwards.

In a fourth aspect thereof the present invention provides a flying insect trapping apparatus in the second or third aspect, in which the pendant attractive plate comprises a plurality of pendant attractive plates joined together so that they widthwise intersect with one another.

According to the invention in the second to fourth aspect thereof, flying insects such as flies or wasps can be induced to land on the pendant attractive plate as a foothold which is suspended from the trap container and flying insects such as flies or wasps which have landed can be induced by their negative geotaxis to move upwards on the pendant attractive plate and then to enter into the inside of the trap container above whereby flying insects such as flies or wasps can be lured or attracted and trapped very well. Accordingly, markedly higher effect of trapping of flying insects such as flies or wasps can be achieved than in conventional methods of trapping flying insects such as flies by luring or attracting them with odors of an attractant insecticide or the like. Moreover, the use of an attractive and inductive member with no adhesive or the like attached thereto eliminates the problem that such as dead flies or the like remain exposed in use, thereby giving users no unpleasant feeling. The problem is also removed that the user's hand or clothing or the like may come to stick to the adhesive. The flying insect trapping apparatus can thus be used very favorably.

Also, the use of the pendant attractive plate of a shape such that its upper side is in the form of a chevron or an arch which becomes narrower in width upwards allows flying insects such as flies or wasps to smoothly move upwards on the upper part of the pendant attractive plate, thereby sharply rising the capture ratio for flying insects such as flies or wasps.

Also, the use of the pendant attractive plate comprising a plurality of pendant attractive plates joined together so that they widthwise intersect with one another allows flying insects such as flies or wasps to visually recognize the pendant attractive plate from any of directions over 360° and thus to land on the pendant attractive plate very well, thereby sharply rising the capture ratio for flying insects such as flies or wasps.

In a fifth aspect thereof the present invention provides a flying insect trapping apparatus in the first aspect, which comprises an upper container formed in its inside with a trap chamber and provided at its underside with an entry port, and a lower support member having the vertical surface portion and disposed under the upper container for supporting the upper container wherein the lower support member has an upper end inserted through the entry port into the upper container.

According to the invention in the fifth aspect thereof, flying insects such as flies or wasps can be induced to land on the vertical surface portion of a lower support member disposed below the upper container and flying insects such as flies or wasps which have landed are guided by their negative geotaxis to move upwards on the surface portion of the lower support member and then to enter into the inside of the upper container whereby flying insects such as flies or wasps can be lured or attracted and trapped very well. Accordingly, markedly higher effect of trapping of flying insects such as flies or wasps can be achieved than in conventional methods of trapping flying insects such as flies by luring or attracting them with odors of an attractant insecticide or the like. Moreover, since flying insects such as flies can be attracted and trapped without using an insecticide or the like of offensive smell, the user will have no unpleasant feeling.

In a six aspect thereof the present invention provides a flying insect trapping apparatus in the first aspect, which comprises a lower container formed over its entire side circumference with an outer circumferential wall as the vertical surface portion and an upper cover mounted on the lower container so as to cover above the lower container and opened at its bottom, wherein a horizontal spacing is formed between an upper outside of the outer circumferential wail the lower container and a lower inside of the upper cover as an entry port through which for flying insects to enter.

In a seventh aspect thereof the present invention provides a flying insect trapping apparatus in the six aspect, in which the said entry port is provided over the entire upper outside circumference of the outer circumferential wall of the lower container.

In an eighth aspect thereof the present invention provides a flying insect trapping apparatus in the sixth or seventh aspect, in which a trap chamber is formed in the inside of at least one of the said lower container and upper cover.

According to the invention in the sixth to eight aspect thereof, flying insects such as flies or wasps which have landed on the outer circumferential wall provided as the vertical surface portion over the entire side circumference of the lower container can be induced utilizing their negative geotaxis to move on the outer circumferential wall upwards and then to enter through the entry port provided upper outside of the outer circumferential wall into the inside whereby flying insects such as flies or wasps can be attracted into and trapped in the inside of the lower container and the upper cover. The result is a sharp rise in the capture ratio for flying insects such as flies or wasps over conventional methods of trapping flying insects such as flies or wasps by luring or attracting them into the inside of a container with odors of an attractant insecticide or the like diffused through a hole opened in the container.

BEST MODE FOR CARRYING OUT THE INVENTION

Mention is made of a flying insect trapping apparatus according to a first form of implementation of the present invention.

Figure 1:
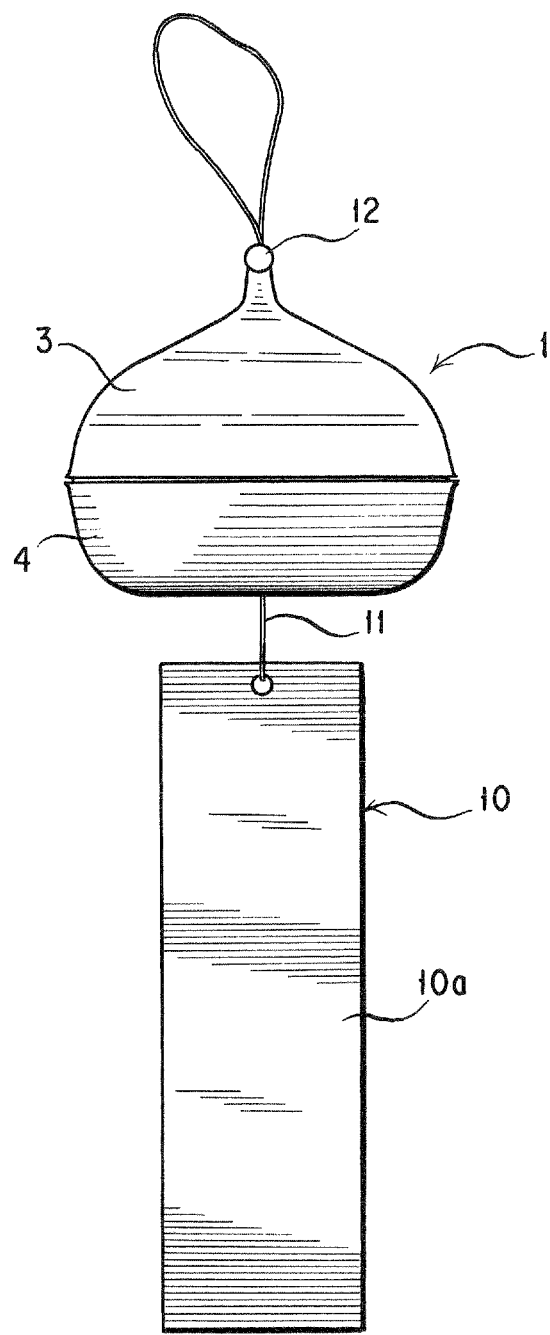
FIG. 1 is a front view of a flying insect trapping apparatus according to a first form of implementation of the present invention.
Figure 2:
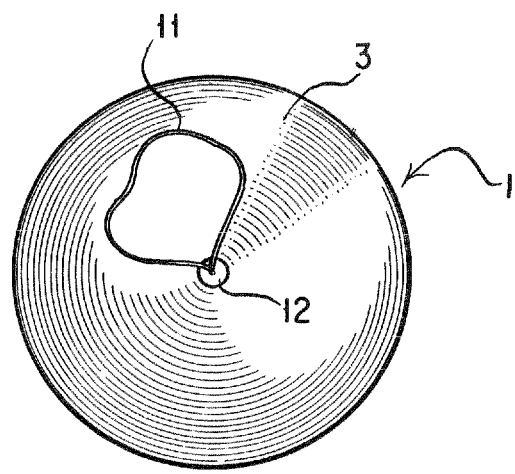
FIG. 2 is a top plan view of the apparatus according to the first form of implementation of the invention.
Figure 3:
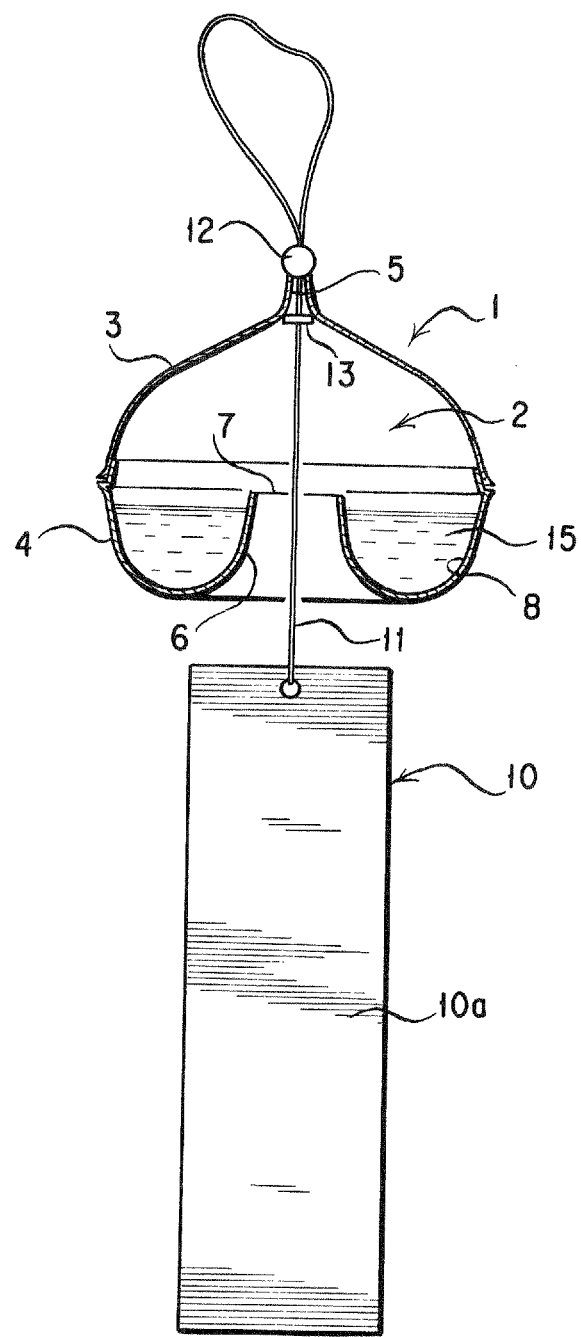
FIG. 3 is a cross sectional view of the apparatus according to the first form of implementation of the invention.

The apparatus according to the first form of implementation as shown in FIGS. 1, 2 and 3 has a trap container 1 formed in its inside with a trap chamber 2. The trap container 1 comprises an upper container member 3 of generally semispherical shape and a lower container member 4 of a dish shape adapted to detachably fit therein to make a hollow structure forming the trap chamber 2. And, the upper container member 3 in the trap container 1 is formed at its central upper end with an opening 5 small in diameter.

On the other hand, the lower container member 4 in the trap container 1 is formed at its lower center with a cylindrical barrel part 6 rising upwards whose upper end is open to form there a vertically opened entry port 7 large in diameter and circular in cross section. And, a ring-shaped recess 8 is formed around the entry port 7.

It should be noted here that the trap container 1 made of the upper and lower container members 3 and 4 is not necessarily generally semispherical or circular-dish shaped as mentioned above but may be of a shape that is conical, pyramidal, columnar, prismatic, rectangular parallelepiped or polyhedral or any other shape.

And, suspended down out of the entry port 7 in the trap container is a pendant attractive plate 10 which is in the form of a longitudinal rectangular strip and whose two sides are each designed to constitute a surface portion 10a. The pendant attractive plate is made of paper, wood, resin or the like material. Attached to an upper part of the pendant attractive plate 10 is a string 11 which is passed through the small opening 5 in the upper container member 3 of the trap container 1, having its upper part looped, and which is provided at desired sites with a push ball 12 and a stopper 13 such that holding the small opening 5 in the upper container member 3 of the trap container 1 forcibly between them allows the string 11 to be fixed at the small opening 5 in the upper container member 3 of the trap container 1, thereby permitting the pendant attractive plate 10 to be suspended from the entry port 7. While, the pendant attractive plate 10 is thus attached via the string 11 to the trap container 1, the pendant attractive plate 10 may be directly attached to the trap container 1 with an upper part modified in shape of the pendant attractive plate 10.

And, by coloring the pendant attractive plate 10, it is possible to enhance the attraction for flying insects such as flies or wasps by the pendant attractive plate. The coloring is preferably in black, red or green and may be not in a single color but in multiple colors.

The pendant attractive plate 10 may be composed of a typical material such as paper, wood or plastic and is not limited in shape to a single longitudinal rectangular strip and may be of any of the shapes and forms as will be mentioned later.

The pendant-attractive plate 10, however, has a size preferred with the visibility and touchability taken into account to attract flying insects such as flies or wasps well and should thus have an area of 1 to 1000 cm$^2$, preferably of 9 to 250 cm$^3$. Also, the pendant attractive plate 10 if in the form of a strip should have a length preferably of 20 cm or less such that a flying insect after landing on the pendant attractive plate 10 is prevented from flying off the plate 10.

And, the recess 8 in the trap chamber 2 inside of the trap container 1 has a liquid 15 received therein. The liquid 15 is an attractant liquid such as brewage or vinegar or fruit juice which has an attracting action. In the case of using an attractant liquid, its attracting action allows flying insects to be better attracted. On the other hand, water if used is convenient in that when used it gives a user no unpleasant feeling at all and that if spilled out it does not soil the floor or the like. Also, such an attractant liquid or water may be used mixed with an insecticide. Further, the substance to be received in the trap chamber 2 is not necessarily in the form of a liquid but may be a gel material or the like, to which also brewage or vinegar or fruit juice may be added. While the recess 8 in the trap chamber 2 is shown as receiving the liquid 15, it should be noted that with the behavior of a flying insect taken into consideration, it is possible that the trap chamber 2 instead of receiving the liquid 15 or the like may simply be coated with an adhesive or have an adhesive sheet stuck on an inner surface area thereof to successfully trap flying insects. If the trap chamber 2 is coated with an adhesive or adhesive sheet on the inner surface area, it may be noted that no ring-shaped recess 8 need be provided in the trap container 1.

Mention is next made of an example of actually using such a flying insect trapping apparatus. In the example, a fly is captured.

The flying insect trapping apparatus is arranged in a kitchen by hanging on a hook provided on a ceiling or a wall of the kitchen, the loop of the string 11 projecting from the small opening 5 of the upper container member 3 in the trap container 1.

Then, a fly which is flying 1 around will take the pendant attractive plate 10 as a foothold and settle or land anywhere on the surface portion 10a of the pendant attractive plate 10. And, the fly which has landed on the surface portion 10a of the pendant attractive plate 10 will, due to the negative geotaxis of a flying insect such as fly or wasp, move upwards on the surface portion 10a of the pendant attractive plate 10. By the negative geotaxis is here meant the nature of flying insects that they move upwards against gravity.

And, traveling up from the pendant attractive plate 10 towards the string 11 and then on the string 11 by this negative geotaxis, the fly will enter through the entry port, 7 of the lower container member 4 in the trap container 1 into the inside of the latter. Then, the fly will fly about in the inside of the trap container 1 and after flying about in the inside of the trap container 1, it will come into contact with the liquid 15 in the trap chamber 2 inside of the trap container 1 so as to be drowned to death if the liquid 15 is an attractant liquid such as vinegar or water or so as to die upon contact with the liquid 15 if it is an attractant liquid or water mixed with an insecticide.

By arranging the flying insect trapping apparatus in a kitchen and trapping flies within the trap chamber 2 inside of the trap container 1 in this manner, it is possible to exterminate flies in the neighborhood of the kitchen. And, the flies trapped in the inside of the trap container 1 can be discharged to allow the flying insect trapping apparatus to be used repeatedly any number of times.

Mention is next made of other possible shapes and forms of the pendant attractive plate 10, though the invention is not intended to be limited to them.

Figure 4:
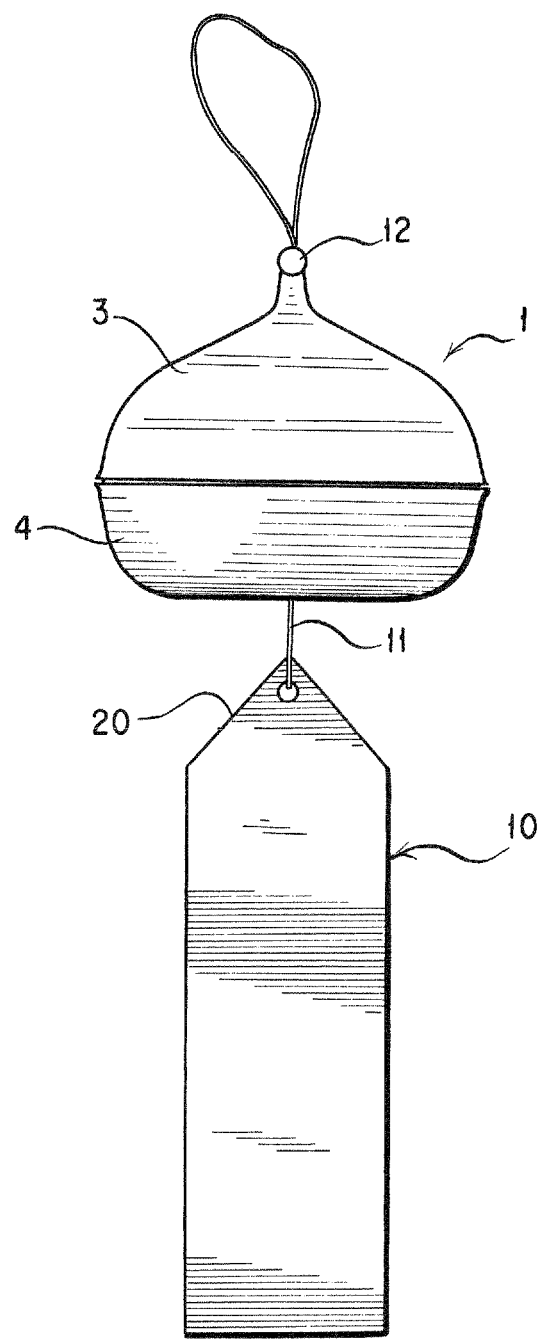
FIG. 4 is a front view illustrating a pendant attractive plate of another possible shape in the apparatus according to the first form of implementation of the invention.
Figure 5:
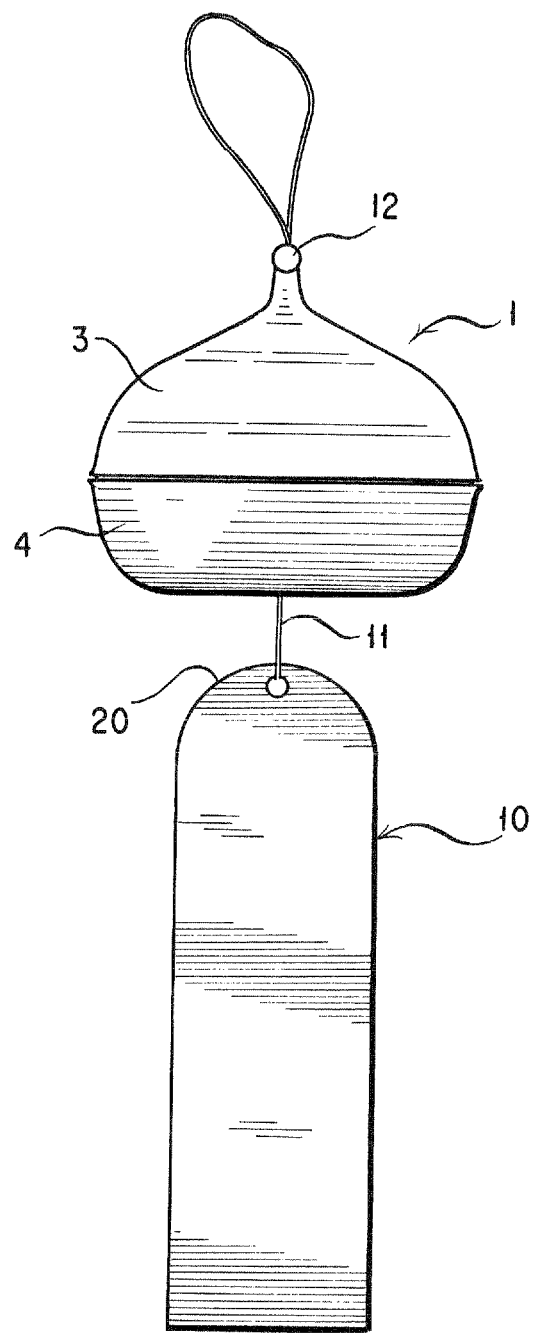
FIG. 5 is a front view illustrating a pendant attractive plate of still another possible shape in the apparatus according to the first form of implementation of the invention.

The pendant attractive plate 10 may be of a shape as shown in FIG. 4 such that its upper side 20 of the plate 10 in the form of a strip is angular in the form of a chevron becoming narrower in width upwards. Alternatively, as shown in FIG. 5 the upper side 20 of the pendant attractive plate 10 may be arched or specifically semicircular becoming narrower in width upwards.

By making the pendant attractive plate 10 narrower in width upwards in a manner as mentioned above, it is possible to ensure that a flying insect such as fly or wasp which has landed on the surface portion 10a of the pendant attractive plate 10 is guided to move, by its negative geotaxis, up to the upper end of the pendant attractive plate 10 and thus guided into the inside of the trap container 1. This can be compared with the case that the upper side 20 is made horizontal where some chance exists that a flying insect that has moved up to the upper end of the pendant attractive plate 10 may fly off the upper side 20. By making the pendant attractive plate 10 in a shape that becomes narrower in width upwards, it is possible to prevent such a fly-off. As to the shape of a pendant attractive plate 10 that becomes narrower in width towards its upper end, the steeper is the upper end the better is the result obtained.

Figure 6:
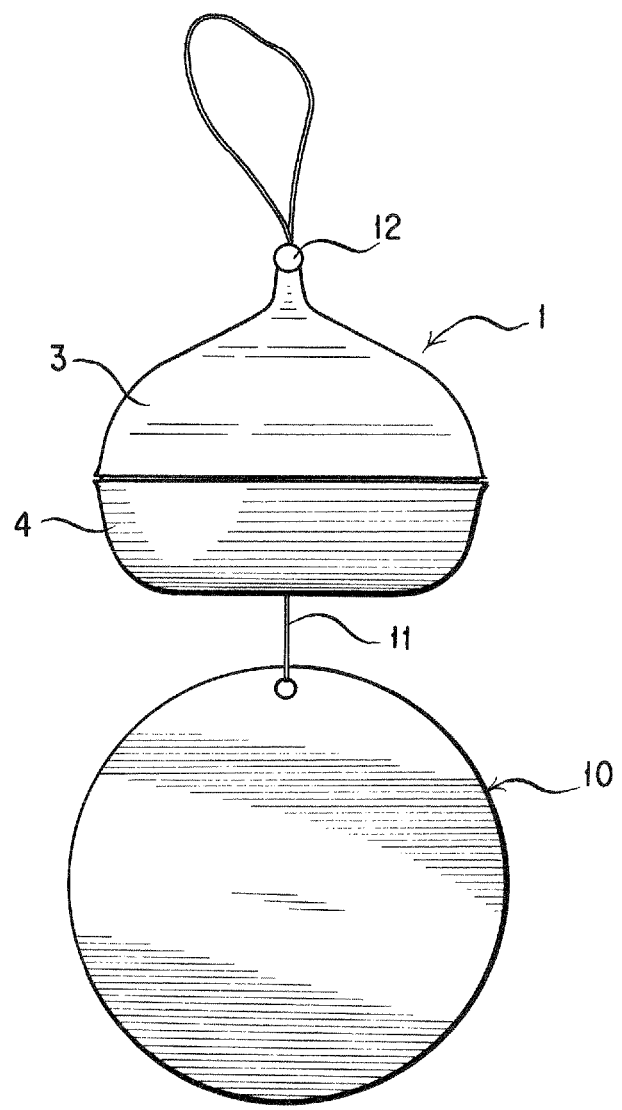
FIG. 6 is a front view illustrating a pendant attractive plate of yet another possible shape in the apparatus according to the first form of implementation of the invention.
Figure 7:
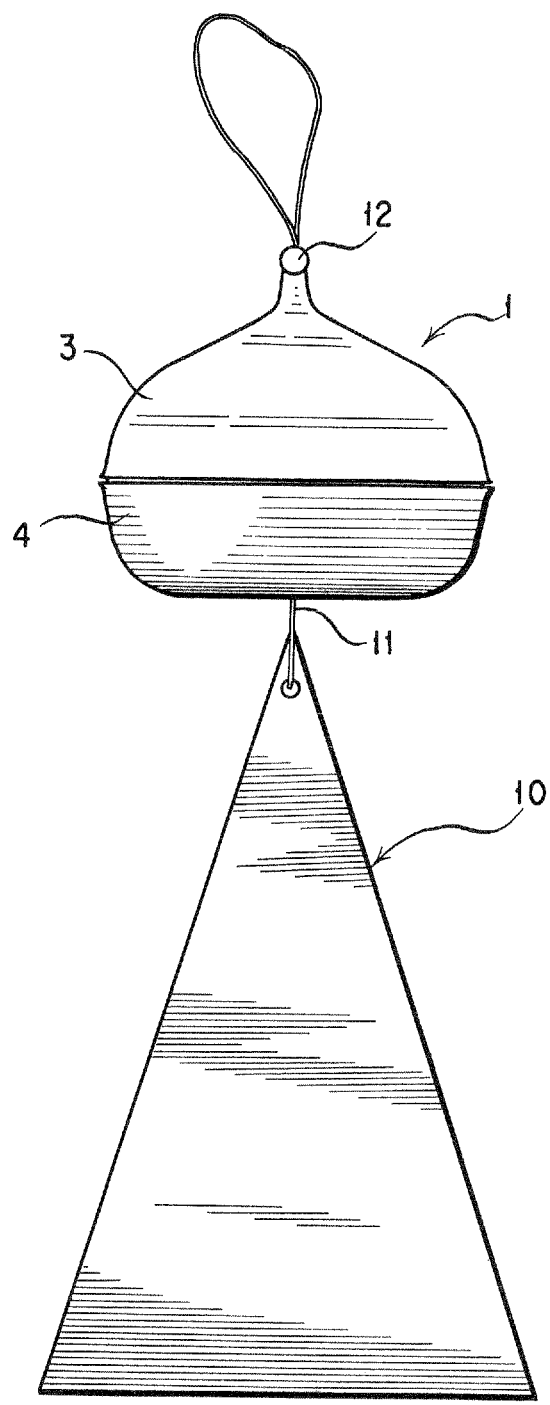
FIG. 7 is a front view illustrating a pendant attractive plate of a further possible shape in the first form of implementation of the invention.

The pendant, attractive plate 10 may be circular on the whole as shown, e. g. in FIG. 6 or triangular on the whole as shown in FIG. 7. Also, it may be polygonal or star-shaped.

Figure 8:
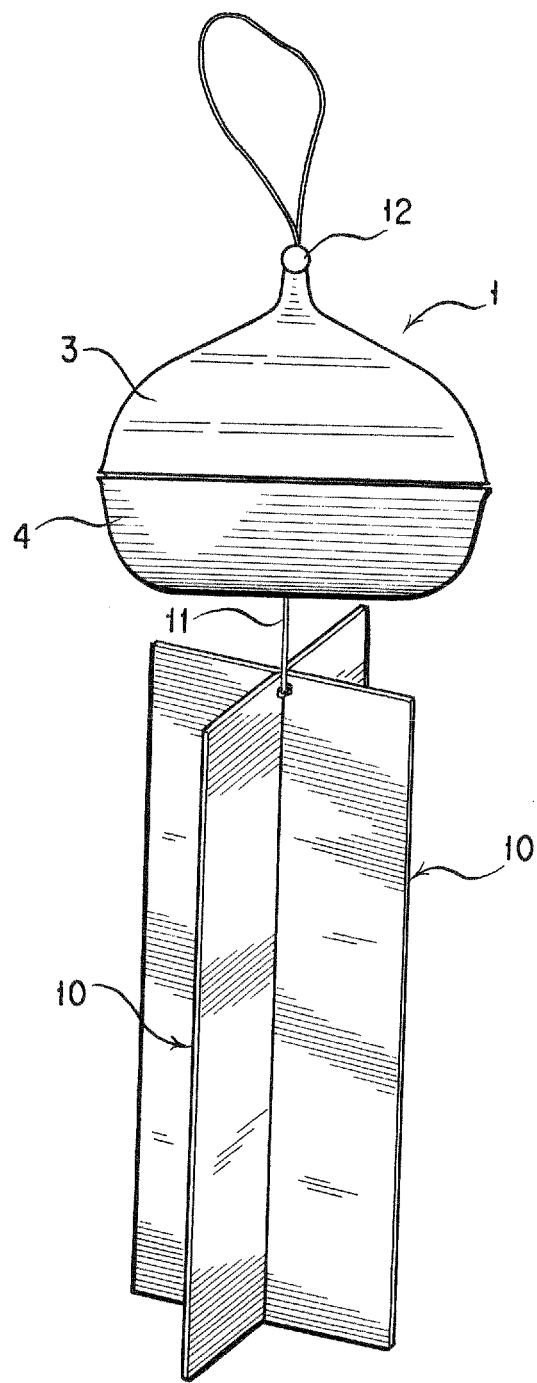
FIG. 8 is a front view illustrating a pendant attractive plate of another possible form in the apparatus according to the first form of implementation of the invention.
Figure 9:
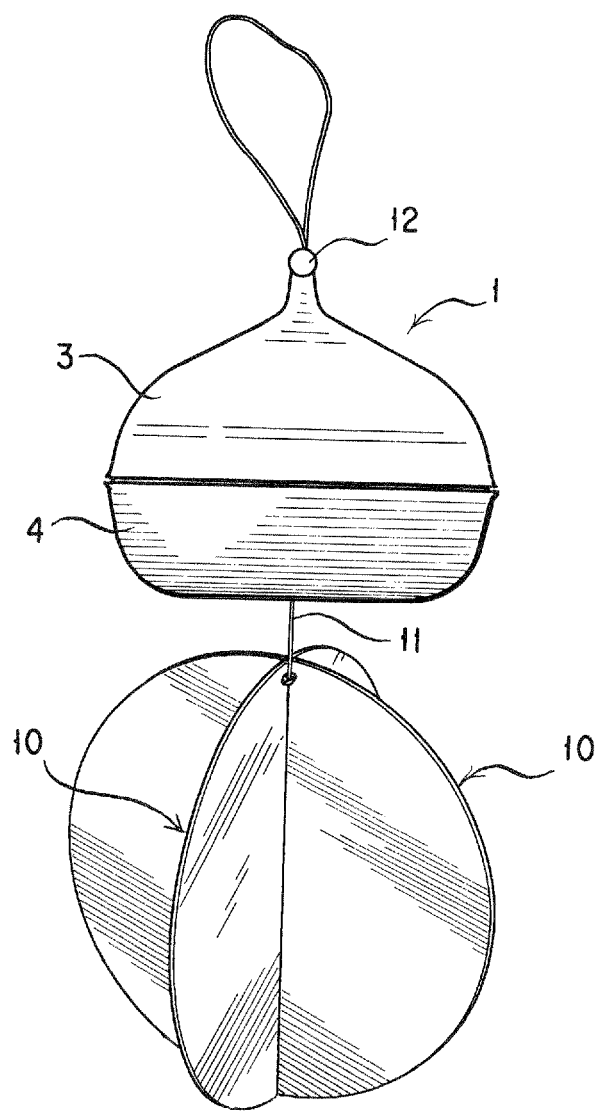
FIG. 9 is a front view illustrating a pendant attractive plate of still another possible form in the apparatus according to the first form of implementation of the invention.
Figure 10:
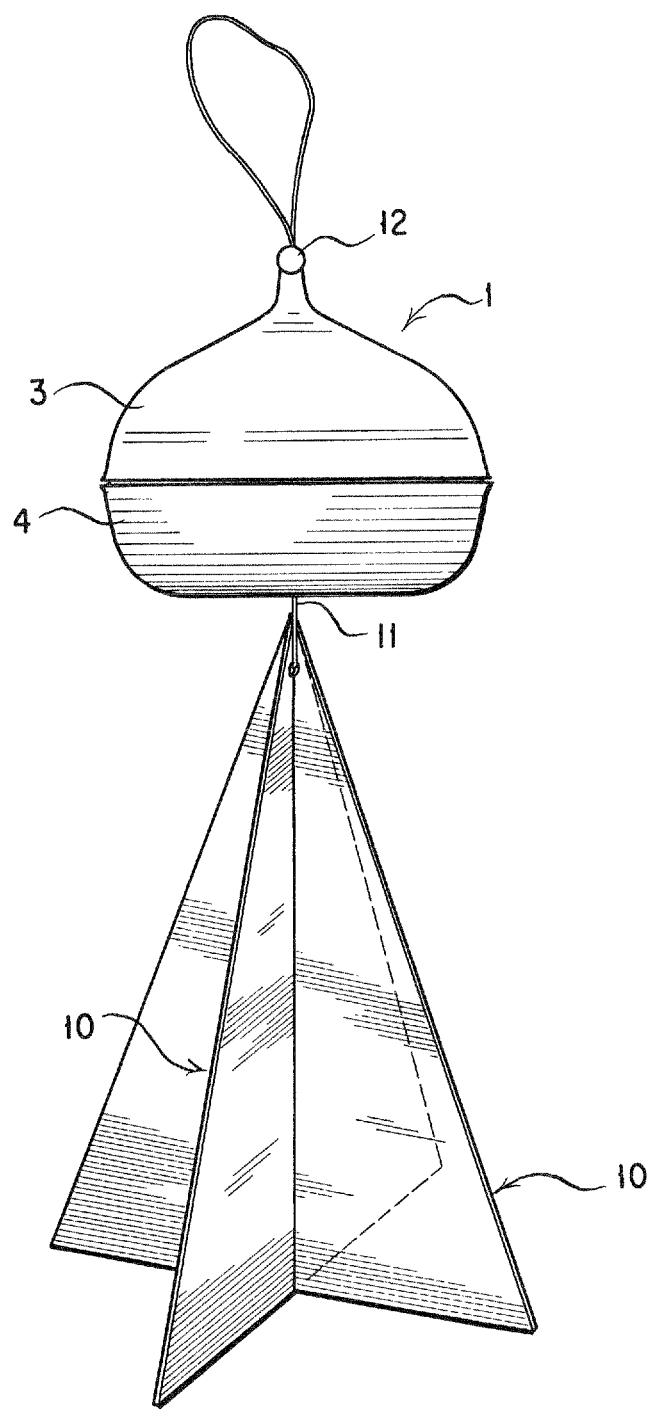
FIG. 10 is a front view illustrating a pendant attractive plate of yet another possible form in the apparatus according to the first form of implementation of the invention.

Further, the pendant attractive plate 10 may be embodied in an alternative form as shown in FIG. 8 such that it comprises a pair of rectangular strip pendant attractive plates 10 joined together so that they widthwise intersect with each other to form a cross in section. And, the two pendant attractive plates 10 forming a cross in section are suspended out of the entry port 7 of the trap container 1. Also, in lieu of the rectangular strip pendant attractive plates 10 joined together, circular strip pendant attractive plates 10 as shown in FIG. 9 or triangular strip pendant attractive plates 10 as shown in FIG. 10 may be used joined together.

By suspending such two attractive plates 10 joined together so as to intersect widthwise with each other and to form a cross in section, it is possible to cause a flying insect such as fly or wasp to visually recognize the pendant attractive plates 10 from any of the directions over 360° and to cause a flying insect such as fly or wasp to land on these pendant attractive plates 10 at an extremely high probability. In other words, by enhancing the attractive force for a flying insect such as fly or wasp towards a pendant attractive plate 10, it is possible to sharply raise the rate of capture for flying insects.

Pendant attractive plates 10 to be joined together are not necessarily two as mentioned above but may be more than two such 10 which may be prepared and joined together.

Mention is next made of tests of the flying insect trapping apparatus according to the present invention.

Figure 11A:
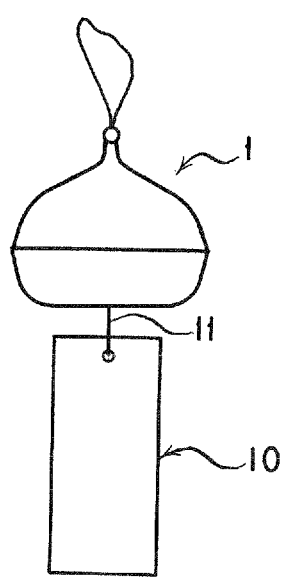
FIGS. 11A and 11B are front views illustrating test apparatus A and B, respectively, in a first test.
Figure 11B:
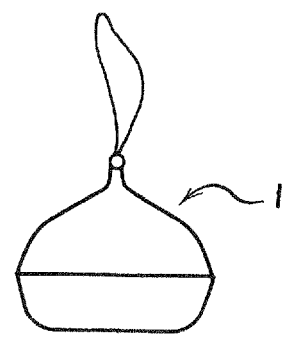

As a first test, a pendant attractive plate 10 was tested on its effect in the frying insect trapping apparatus. A test apparatus A having a rectangular strip pendant attractive plate 10 suspended as shown in FIG. 11A and a test apparatus B having no such pedant attractive plate 10 suspended as shown in FIG. 11B were used and respective capture numbers in the trap chambers in the test apparatus A and B were found out. The rectangular strip pendant attractive plate 10 in the test apparatus A was a black colored vinyl chloride plate having a length of 15 cm. a width of 6.5 cm and a thickness of 0.5 mm. Also, in the trap container 1 in each test apparatus there was received a liquid containing vinegar (red vinegar) on the market and water at 1/1.

And, each of the test apparatus A and B was suspended from the ceiling of a chamber (with a size of 1.82 m long, 1.82 wide and 1.82 m high) into which 100 yellow fruit-flies (*Drosophila melanogaster*) and 50 houseflies (*Domestica musca*) were released, and after lapse of 24 hours the respective numbers of flies trapped in the test the test apparatus A and B, namely capture numbers, were counted. Results of the test are shown in Table 1 below.

TABLE 1

| | Capture Number of Yellow fruit-flies | Capture Number of Houseflies | Total Capture Number |
|---|---|---|---|
| Test apparatus A | 75 | 39 | 114 |
| Test apparatus B | 2 | 0 | 2 |

From the test results that the capture numbers were 114 and 2 for the test apparatus A and B, respectively, it is evidently seen that it is strikingly more effective to trap if the pendant attractive plate 10 is suspended than if it is not.

Figure 12A:
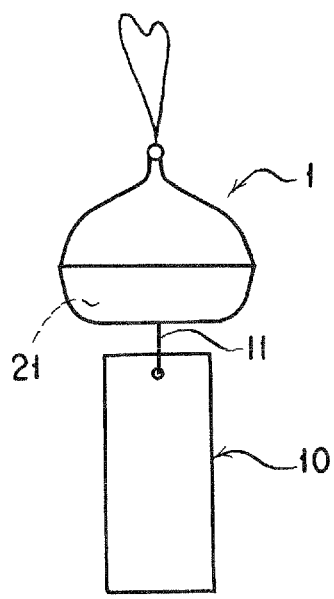
FIGS. 12A and 12B are front views illustrating test apparatus and B, respectively, in a second test.
Figure 12B:
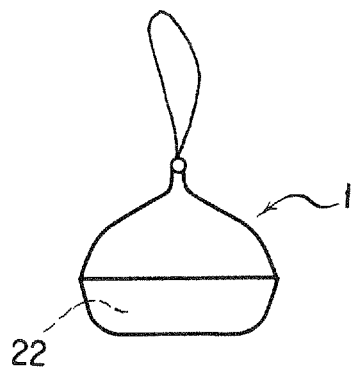

As a second test, a flying insect trapping apparatus according to the present invention and the conventional trapping apparatus were tested on their trapping effects. There were used a test apparatus A as shown in FIG. 12A which had water 21 alone received in the trap container 1 and the rectangular strip pendant attractive plate 10 suspended below the trap container 1 and a test, apparatus B as shown in FIG. 12B which as in the conventional trapping apparatus had no such pendant attractive plate 10 suspended and had an attractant liquid 22 received in the trap container 1 so as to trap by attracting odor of the attractant liquid, and respective capture numbers trapped inside of the trap containers 1 in the test apparatus A and B were examined. Here, the rectangular strip pendant attractive plate 10 in the test apparatus A was a black colored vinyl chloride plate having a length of 15 cm, a width of 6.5 cm and a thickness of 0.5 mm.

And, each of the test apparatus A and B was suspended from the ceiling of a chamber (with a size of 1.82 m long, 1.82 wide and 1.82 m high) into which 100 yellow fruit-flies and 50 houseflies were released, and after lapse of 24 hours the respective numbers of flies trapped in the test apparatus A and B, namely capture numbers, were counted. Results of the test are shown in Table 2 below.

TABLE 2

| | Capture Number of Yellow fruit-flies | Capture Number of Houseflies | Total Capture Number |
|---|---|---|---|
| Test apparatus A | 40 | 37 | 77 |
| Test apparatus B | 10 | 2 | 12 |

From the test results that the capture numbers were 77 and 12 for the test apparatus A and B, respectively, it is evidently seen that the apparatus according to the present invention having the pendant attractive plate 10 suspended is markedly more effective to trap flying insects than the conventional apparatus trapping them by attracting odor of an attractant liquid.

As a third test, the flying insect trapping apparatus was examined on sizes of a pendant attractive plate 10. First, a black colored vinyl chloride sheet of 0.5 mm thick was prepared from which were fabricated a square plate of one side of 3 cm (its area of 9 cm$^2$), a square plate of one side of 4.5 cm (its area of 20.25 cm$^2$), a square plate of one side of 6 cm (its area of 36 cm$^2$), a square plate of one side of 9 cm (its area of 81 cm$^2$), a square plate of one side of 13 cm (its area of 169 cm$^2$) and a square plate of one side of 16 cm (its area of 256 cm$^2$), and each of these plates was suspended as a pendant attractive plate 10 from a trap container 1. Then, a trap container with no such pendant attractive plate 10 (area of 0 cm$^2$) was identified as test apparatus A, the trap container with the plate of one side of 3 cm (its area of 9 cm$^2$) as test apparatus B, that with the plate of one side of 4.5 cm (its area of 20.25 cm$^2$) as test apparatus C, that with the plate of one side of 6 cm (its area of 36 cm$^2$) as test apparatus D, that with the plate of one side of 9 cm (its area of 81 cm$^2$) as test apparatus E, that with the plate of one side of 13 cm (its area of 169 cm$^2$) as test apparatus F and that with the plate of one side of 16 cm (its area of 256 cm$^2$) as test apparatus G. Here, the container 1 in each test apparatus had an attractant liquid containing vinegar (red vinegar) on the market and water at 1/1 received therein.

And, each of the test apparatus A, B, C, D, E, F and G was suspended from the ceiling of a chamber (with a size of 1.82 m long, 1.82 wide and 1.82 m high) into which 350 yellow fruit-flies were released, and after lapse of 24 hours the respective numbers of flies trapped in the test apparatus A to G, namely capture numbers, were counted. Results of the test are shown in Table 3 below.

TABLE 3

| | Capture Number |
|---|---|
| Test apparatus A (None) | 1 |
| Test apparatus B (3 cm × 3 cm) | 20 |
| Test apparatus C (4.5 cm × 4.5 cm) | 37 |
| Test apparatus D (6 cm × 6 cm) | 47 |
| Test apparatus E (9 cm × 9 cm) | 60 |
| Test apparatus F (13 cm × 13 cm) | 79 |
| Test apparatus G (16 cm × 16 cm) | 82 |

It is seen that the test apparatus A had its capture number of 1, the test apparatus B had the capture number sharply increased to 20, the test apparatus C and D had their capture numbers increased further to 37 and 47 and then the test apparatus E, F and G has their capture numbers increased yet further.

As far as the size of a pendant attractive plate 10 is concerned, it is thus seen that as its area is increased to about 9 cm$^2$ or more as in the test apparatus B, flies can better be trapped and as its area is increased more, the capture number is further increased; the size has a notable impact on the capture number. However, if the pendant attractive plate 10 is made too large, the problem likely arises that the flying insect trapping apparatus may itself become inferior not only in the design but also practicality aspect. In addition, the problem arises that if the distance from the place where a fly land on the pendant attractive plate 10 upwards to the trap container 1 is too long, e. g. longer than about 20 cm, then the fly having landed on the pendant attractive plate 10 may fly off the plate. From these reasons, the pendant attractive plate 10 should be sized to have an area of 1 to 1000 cm$^2$, preferably 9 to 250 cm$^2$, more preferably 20 to 170 cm$^2$.

Figure 13A:
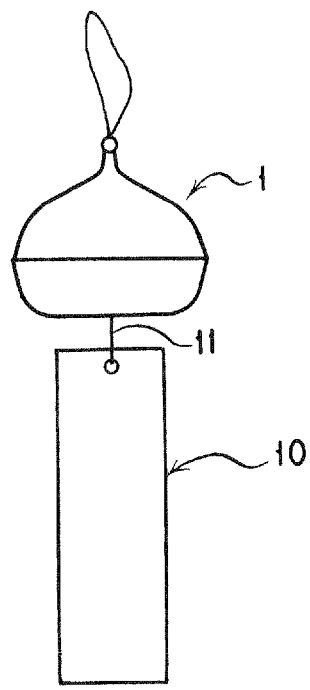
FIGS. 13A to 13C are front views illustrating test apparatus A to C, respectively, in a fourth test.
Figure 13B:
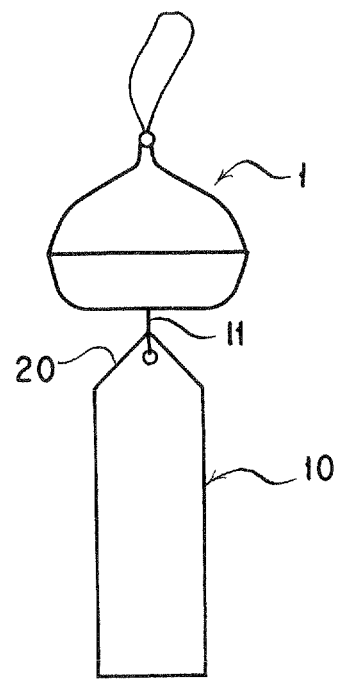
Figure 13C:
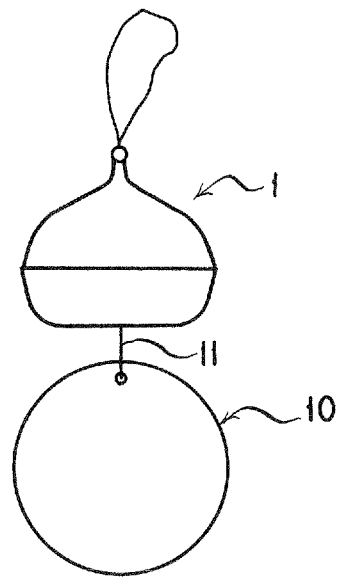

As a fourth test, the pendant attractive plate 10 in the flying insect trapping apparatus was examined on its shapes. There were used a test apparatus A having a pendant attractive plate 10 in the form of a longitudinal rectangular strip suspended under the trap container 1 as shown in FIG. 13A, a test apparatus B having a strip pendant attractive plate 10 having its upper side 20 in the form of a chevron becoming narrower in width towards the upper end suspended as shown in FIG. 13B and a test apparatus having a circular pendant attractive plate 10 suspended as shown in FIG. 13C, and respective capture numbers into the inside of the trap containers 1 in the test apparatus A to C were found out. The pendant attractive plate 10 in each of the test apparatus was a black colored vinyl chloride plate having a thickness of 0.5 mm. Here, all of these pendant attractive plates had an area of about 80 cm$^2$, namely an identical area. Also, in the inside of the trap container 1 in each test apparatus there was received an attractant liquid containing vinegar (red vinegar) on the market and water at 1/1.

And, each of the test apparatus A, B and C was suspended from the ceiling of a chamber (with a size of 1.82 m long, 1.82 wide and 1.82 m high) into which 100 yellow fruit-flies were released, and after lapse of 24 hours the respective numbers of flies trapped in the test apparatus A to C, namely capture numbers, were counted. Results of the test are shown in Table 4 below.

TABLE 4

| | Capture Number |
|---|---|
| Test apparatus A | 12 |
| Test apparatus B | 41 |
| Test apparatus C | 42 |

From the test, results that the test apparatus A, B and C had their respective capture numbers of 12, 41 and 42, it is seen that it is evidently much more effective to trap if the upper side 20 of the pendant attractive plate 10 is made of chevron or circular becoming narrower in width towards the upper end (test apparatus B and C) than if the upper side 20 is horizontal (test apparatus A).

This is apparently because when the upper side 20 of the pendant attractive plate 10 is made so angled or circular (arched), a fly having landed on the plate 10, in moving by negative geotaxis to the upper end thereof and then entering into the trap chamber 1, can more smoothly be guided to move upwards than when the upper side 20 is horizontal, thereby preventing the fly from flying off the pendant attractive plate 10.

Figure 14A:
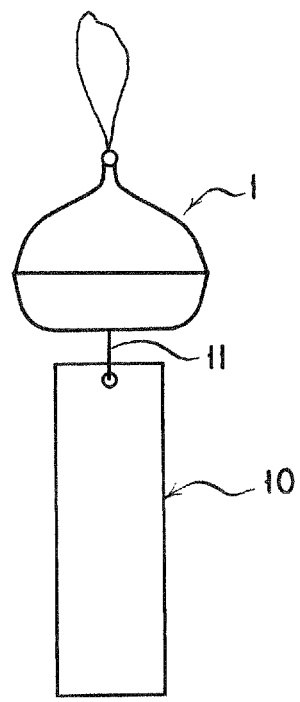
FIGS. 14A to 14D are front views illustrating test apparatus A to D, respectively, in a fifth test.
Figure 14B:
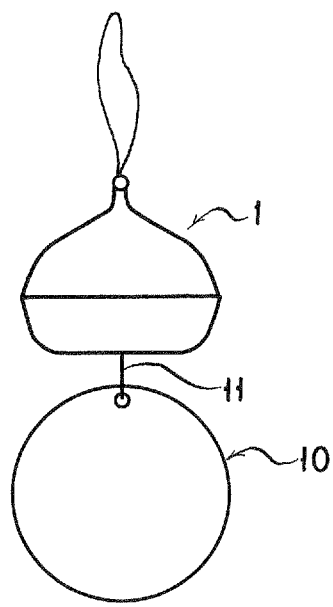
Figure 14C:
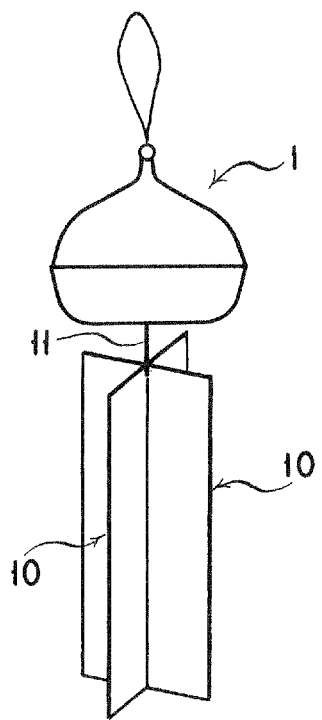
Figure 14D:
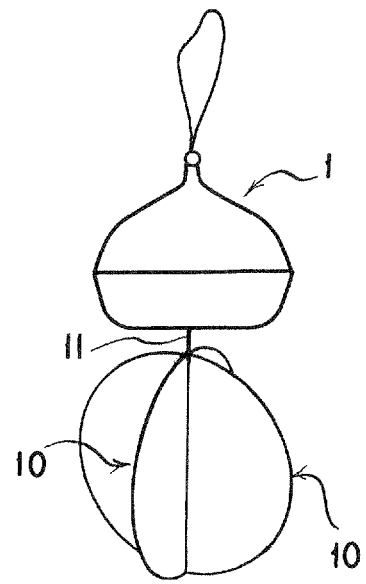

As a fifth test, the pendant attractive plate 10 in the flying insect trapping apparatus was examined on its forms. There were used a test apparatus A having a longitudinal rectangular strip pendant attractive plate 10 suspended under the trap container as shown in FIG. 14A, a test apparatus having a circular pendant attractive plate 10 suspended as shown in FIG. 14B, a test apparatus C having a pair of rectangular strip pendant attractive plates 10 (as in the test apparatus A) joined together so as to intersect with each other forming a cross in section suspended as shown in FIG. 14C and a test apparatus having a pair of circular pendant attractive plates (as in the test apparatus B) suspended as shown in FIG. 14D, and respective capture numbers into the inside of the trap containers 1 in the test apparatus A to D were found out. Here, the pendant attractive plate 10 in each of the test apparatus was a black colored vinyl chloride plate having a thickness of 0.5 mm and an area of about 80 cm², namely an identical area. Also, in the inside of the trap container 1 in each test apparatus there was received an attractant liquid containing vinegar (red vinegar) on the market and water at 1/1.

And, each of the test apparatus A, B, C and D was suspended from the ceiling of a chamber (with a size of 1.82 m long, 1.82 wide and 1.82 m high) in which 150 yellow fruit-flies were released, and after lapse of 24 hours the respective numbers of flies trapped in the test apparatus A to D, namely capture numbers, were counted. Results of the test are shown in Table 5 below.

TABLE 5

| | Capture Number |
|---|---|
| Test apparatus A | 4 |
| Test apparatus B | 11 |
| Test apparatus C | 26 |
| Test apparatus D | 90 |

From the test results that the test apparatus A, B, C and D had their respective capture numbers of 4, 11, 26 and 90, it is seen that with that which uses two pendant attractive plates 10 joined together so as to intersect with each other forming a cross in section it is evidently much more effective to trap than with that which uses a single pendant attractive plate 10. Especially, with circular pendant attractive plates 10 joined together to form a cross, the result obtained proves excellent.

From such results, it is seen that one which uses two pendant attractive plates 10 joined together so as to intersect with each other forming a cross in section is higher in capture ratio that one which uses a single pendant attractive plate 10, it being conceivable that using three or more pendant attractive plates joined together will further enhance the capture ratio.

In this connection, a flying insect such as fly is capable of recognizing an object by vision. Thus, with a plurality of pendant attractive plates 10 joined together, the flying insect will visually recognize the pendant attractive plates 10 well from any of the directions over 360° by taking them as a perch or roost to land on anywhere on them as a foothold.

Figure 15A:
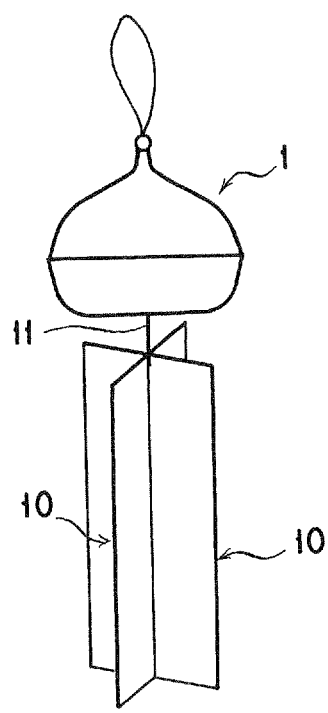
FIGS. 15A to 15C are front views illustrating test apparatus A to C, respectively, in a sixth test.
Figure 15B:
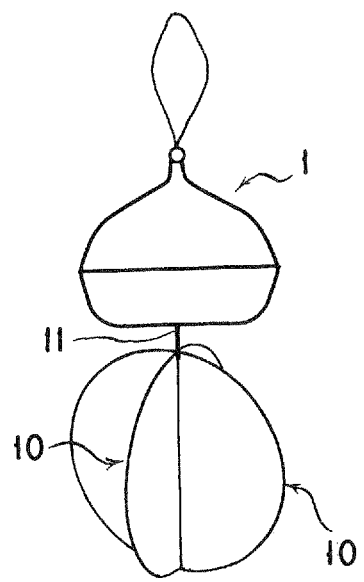
Figure 15C:
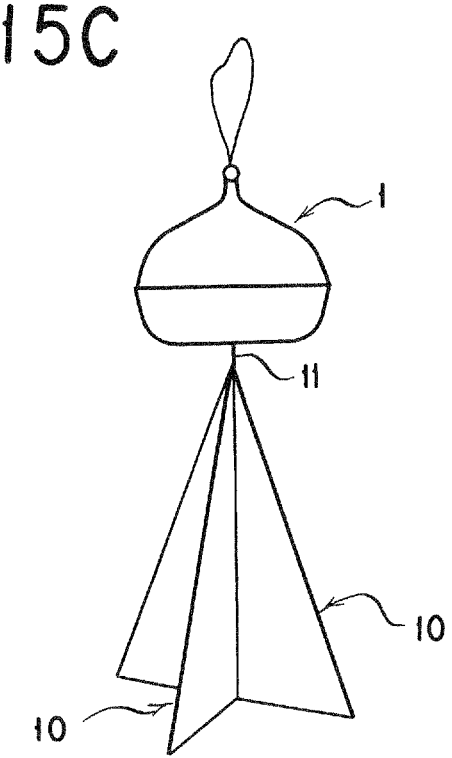

As a sixth test, two pendant attractive plates in the flying insect trapping apparatus such that they are joined together to form a cross in section were examined on their shapes. There were used a test apparatus A in which two longitudinal rectangular strip pendant attractive plates 10 whose upper sides 20 are each angular and which are joined together to intersect widthwise with each other so that they form a cross in section are suspended under the trap container 1 as shown in FIG. 15A, a test apparatus B in which two circular pendant attractive plates 10 joined together to intersect widthwise with each other so that they form a cross in section are suspended under the trap container 1 as shown in FIG. 15B and a test apparatus C in which two triangular pendant attractive plates 10 joined together to intersect widthwise with each other so that they form a cross in section are suspended under the trap container 1 as shown in FIG. 15C, and respective capture numbers trapped inside of the trap containers 1 in the test apparatus A, B and C were examined. The pendant attractive plate 10 in each of the test apparatus was a black colored vinyl chloride plate having a thickness of 0.5 mm. Here, all of these pendant attractive plates had an area per each one of about 80 cm², namely an identical area. Also, in the inside of the trap container 1 in each test apparatus there was received an attractant liquid containing vinegar (red vinegar) on the market and water at 1/1.

And, each of the test apparatus A, B and C was suspended from the ceiling of a chamber (with a size of 1.82 m long, 1.82 wide and 1.82 m high) in which 200 yellow fruit-flies were released, and after lapse of 24 hours the respective numbers of flies trapped in the test apparatus A to C, namely capture numbers, were counted. Results of the test are shown in Table 6 below.

TABLE 6

| | Capture Number |
|---|---|
| Test apparatus A | 42 |
| Test apparatus B | 46 |
| Test apparatus C | 77 |

The Table shows that the test apparatus A, B and C had their respective capture numbers of 42, 46 and 77. It is thus seen that the test apparatus C using triangular pendant attractive plates 10 is higher in capture number than the test apparatus A using essentially rectangular strip pendant attractive plates 10 and the test apparatus B using circular pendant attractive plates 10 and hence that the use of triangular pendant attractive plates is most effective in trapping flies.

Mention is next made of a flying insect trapping apparatus according to a second form of implementation of the present invention.

Figure 16:
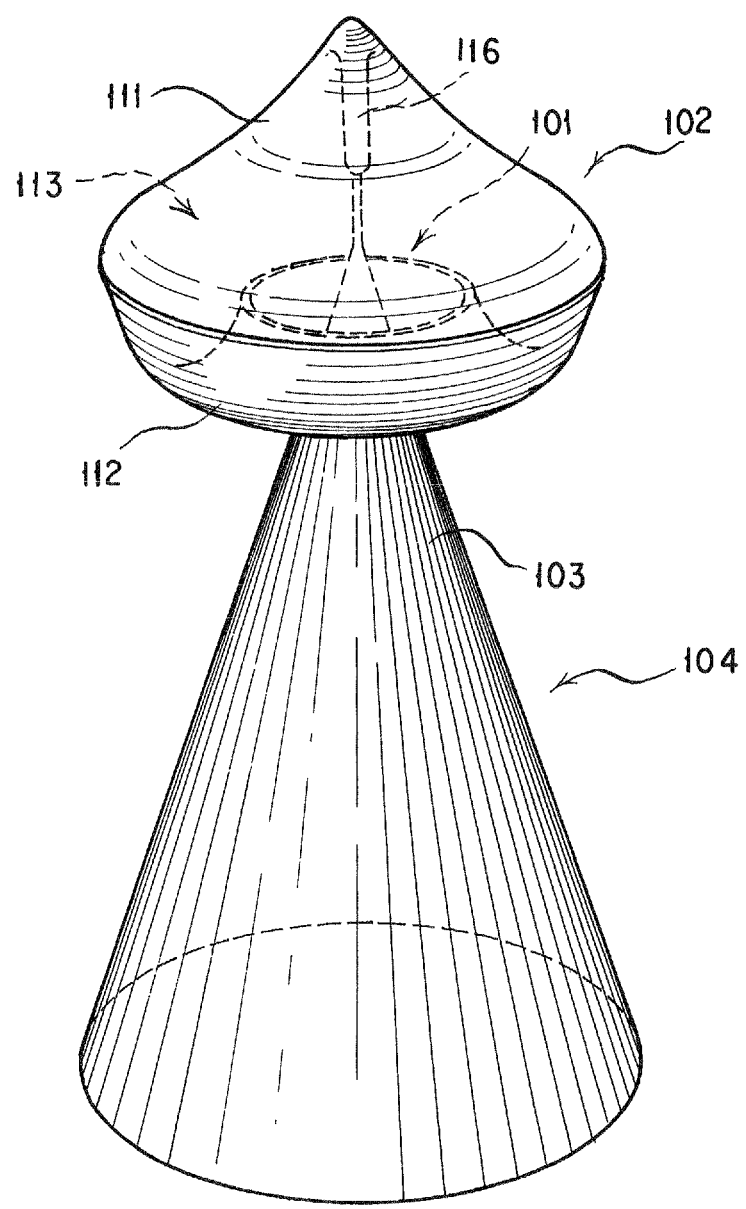
FIG. 16 is a perspective view of a flying insect trapping apparatus according to a second form of implementation of the present invention.
Figure 17:
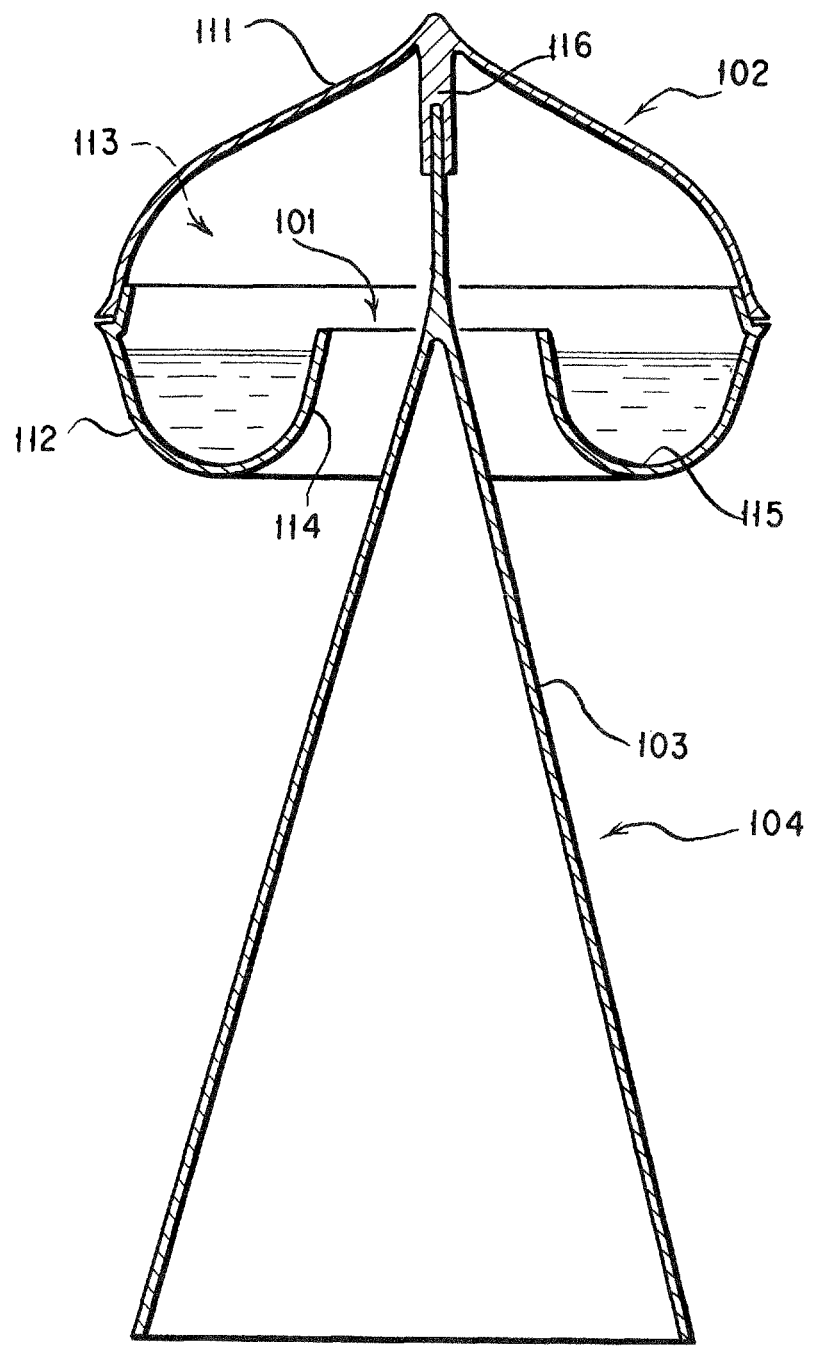
FIG. 17 is a cross sectional view of the apparatus according to the second form of implementation of the invention.

The flying insect trapping apparatus here as shown in FIGS. 16 and 17 comprises a hollow upper container 102 provided at its underside with a vertically opened entry port 101 and a lower support member 104 having a longitudinal surface portion 103 and disposed downwards of the upper container 102 for supporting the upper container 102.

The upper container 102 comprises a generally semispherical upper body 111 and a lower member 112 in the form of a circular dish which are adapted to fit with each other to form a hollow structure defining a trap chamber 113 in its inside.

The lower member 112 in the upper container 102 is formed at its lower center with a cylindrical barrel part 114 rising upwards whose upper end is open to form there the vertically opened entry port 101 large in diameter and circular in cross section. And, a ring-shaped recess 115 is formed around the entry port 101.

It should be noted here that the upper container 102 made of the upper and lower members 111 and 112 is not necessarily generally semispherical or circular-dish shaped as mentioned above but may be of a shape that is conical, pyramidal, columnar, prismatic, rectangular parallelepiped or polyhedral or any other shape.

Also, the upper container 102 is opaque white in color so that its inside is seen through it. It is, however, not necessarily of the color mentioned but it suffices if the same is of a light color such a white including opaque white.

On the other hand, the lower support member 104 is a conical three-dimensional shape whose entire side surface is here used as the surface portion 103, i. e., has the surface portion 103. And, the lower support member 104 has its upper end inserted through the entry port 101 provided at the underside of the upper container 102, into the inside of the upper container 102 so that the upper end is removably received in a fitting portion 116 projecting downwards from the center of the upper body 111 in the upper container 102.

The lower support member 104 is colored typically in black but in general may sufficiently be of a dark color such as dark brown or black.

And, the recess 115 in the trap chamber 113 inside of the upper container 102 has a liquid received therein. The liquid is an attractant liquid such as brewage or vinegar or fruit juice which has an attracting action. In the case of using an attractant liquid, its attracting action allows flying insects to be better attracted. On the other hand, water if used is convenient in that when used it gives a user no unpleasant feeling at all and that if spilled out it does not soil the floor or the like. Also, such an attractant liquid or water may be used mixed with an insecticide. Further, the substance to be received in the trap chamber 113 is not necessarily in the form of a liquid but may be a gel material or the like, to which also brewage or vinegar or fruit juice may be added. While the recess 115 in the trap chamber 113 is shown as receiving the liquid, it should be noted that with the behavior of a flying insect taken into consideration, it is possible that the trap chamber 113 instead of receiving the liquid or the like may simply be coated with an adhesive or have an adhesive sheet stuck on an inner surface area thereof to successfully trap flying insects. If the trap chamber 113 is coated with an adhesive or adhesive sheet on the inner surface area, it may be noted that no ring-shaped recess 115 need be provided in the trap container 102.

Mention is then made of an example of actually using such a flying insect trapping apparatus. In the example, a fly is captured.

The flying insect trapping apparatus is disposed, e. g. in a kitchen. Then, a fly which is flying 1 around will land anywhere on the surface portion 103 of the lower support member 104 in the flying insect trapping apparatus. And, the fly which has landed on the surface portion 103 of the lower support member 104 will, due to the negative geotaxis of a flying insect such as fly or wasp, move on the surface portion 103 upwards, i. e., is guided to move upwards. By the negative geotaxis is here meant the nature of flying insects that they move upwards against gravity.

And, traveling up on the surface portion 103 of the lower support member 104 by this negative geotaxis, the fly will enter through the entry port 101 of the lower member 112 in the upper container 102 into the inside of the latter. Then, the fly will fly about in the inside of the upper container 102 and after flying about in the inside of the upper container 102, it will come into contact with the liquid in the recess 115 of the trap chamber 113 inside of the upper container 102 so as to be drowned to death if the liquid is an attractant liquid such as vinegar or water or so as to die upon contact with the liquid if it is an attractant liquid or water mixed with an insecticide.

Thus, by arranging the flying insect trapping apparatus in a kitchen and guiding the flies which have landed on the surface portion 103 of the lower support; member 104 to move on the surface portion 103 upwards and then leading the flies through the entry port 101 into the inside of the upper container 102 to trap the flies, it is possible to exterminate flies in the neighborhood of the kitchen. And, the flies trapped in the inside of the upper container 102 can be discharged to allow the flying insect trapping apparatus to be used repeatedly any number of times.

By utilizing the negative geotaxis of flying insects to guide the flies which have landed on the surface portion 103 of the lower support member 104 to move on the surface portion 103 upwards and then to lead the flies through the entry port 101 into the inside of the upper container 102 in this manner, it is possible to trap flies well and to raise the capture ratio for flies drastically.

Mention is next made of other possible shapes and forms of the lower support member, though the invention is not intended to be limited to them.

Figure 18:
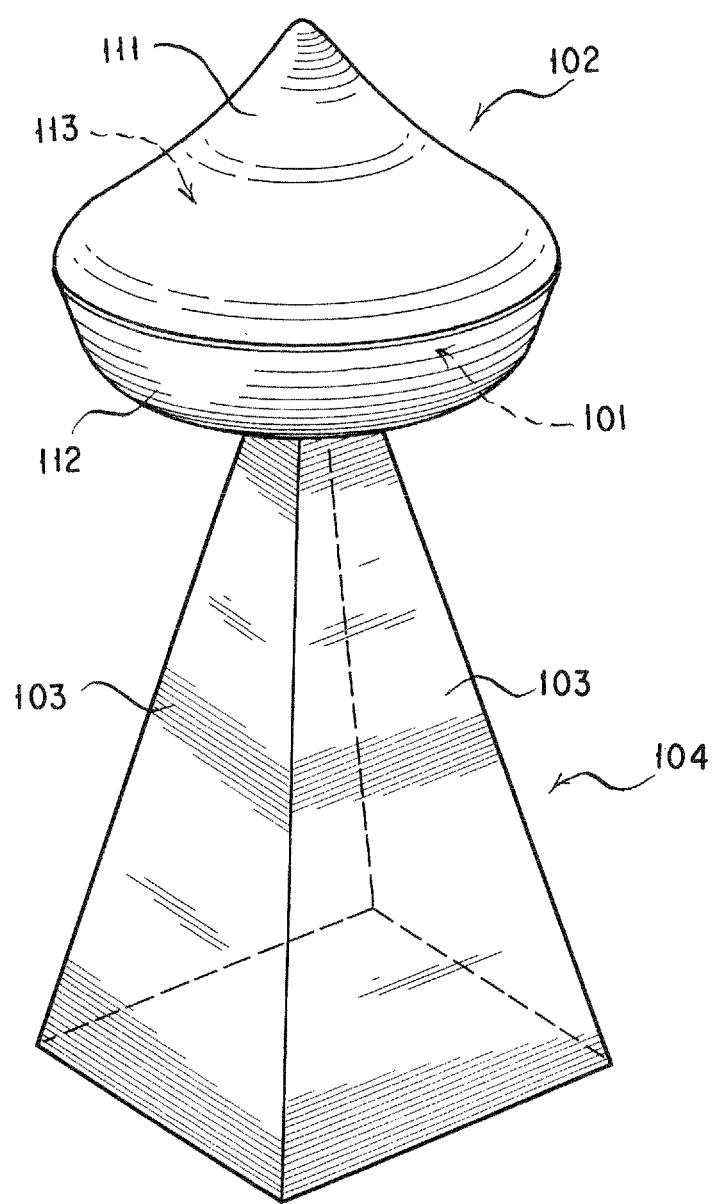
FIG. 18 is a perspective view illustrating an alternative lower support member in the apparatus according to the second form of implementation of the invention.
Figure 19:
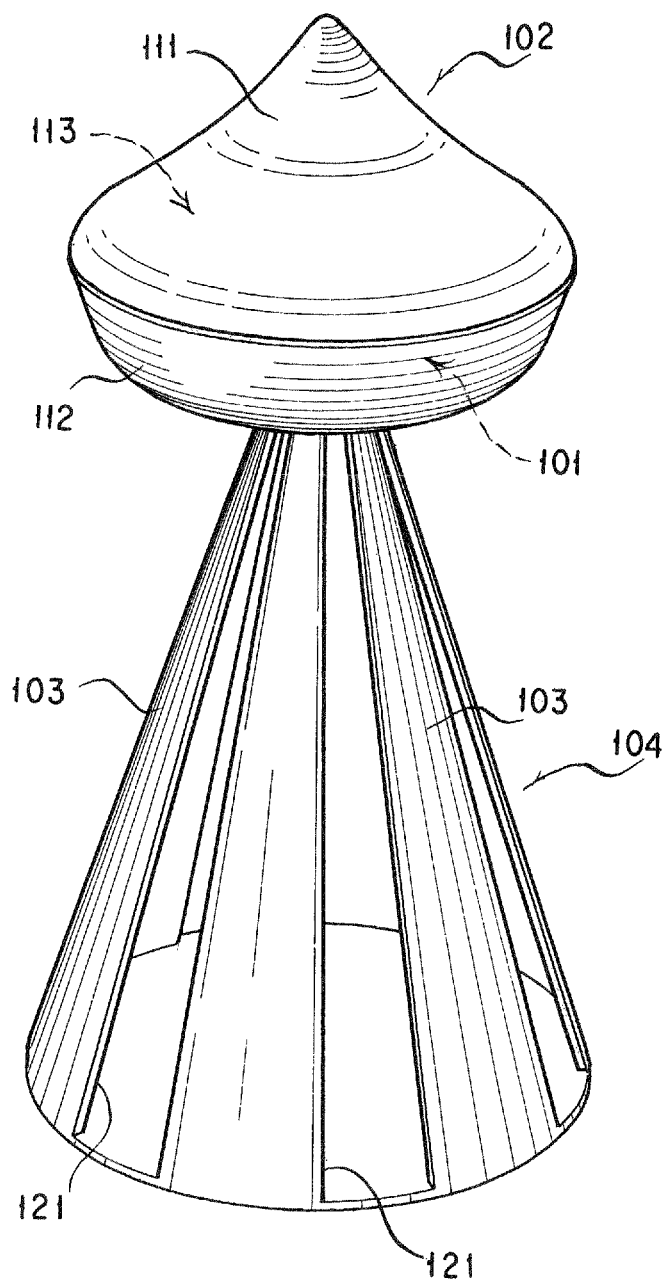
FIG. 19 is a perspective view of another alternative lower support member in the apparatus according to the second form of implementation of the invention.
Figure 20:
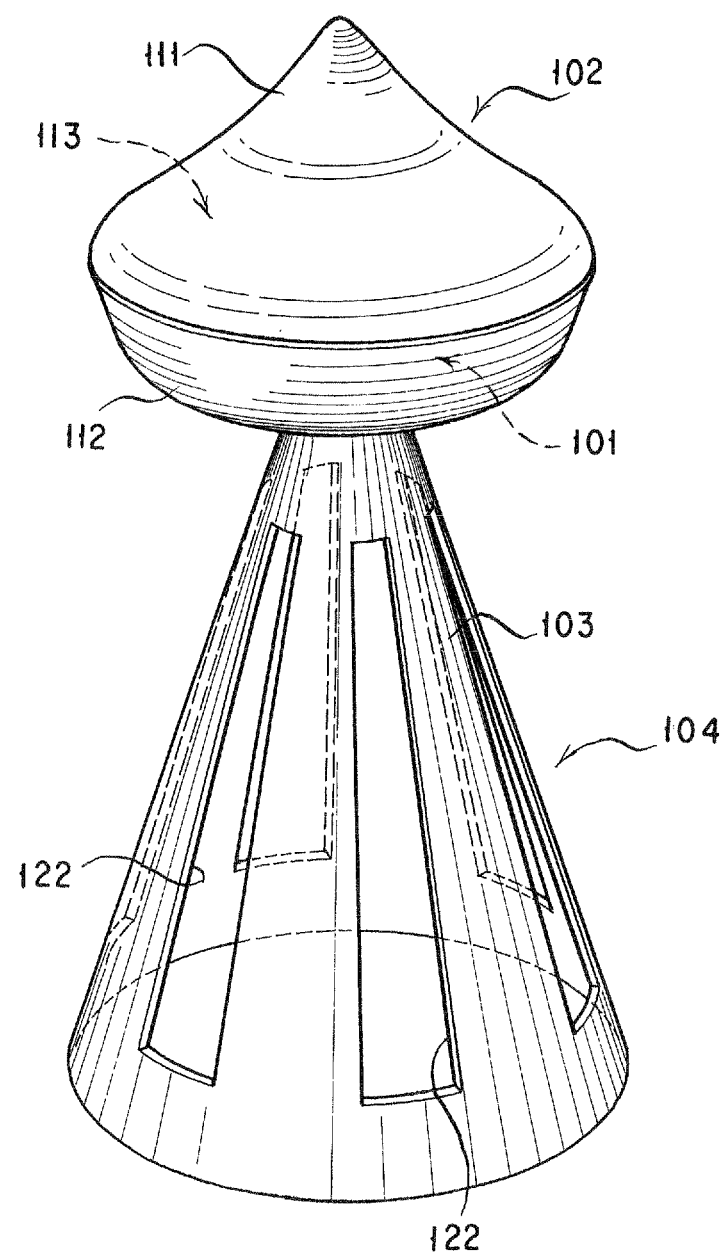
FIG. 20 is a perspective view of a further alternative lower support member in the apparatus according to the second form of implementation of the invention.
Figure 21:
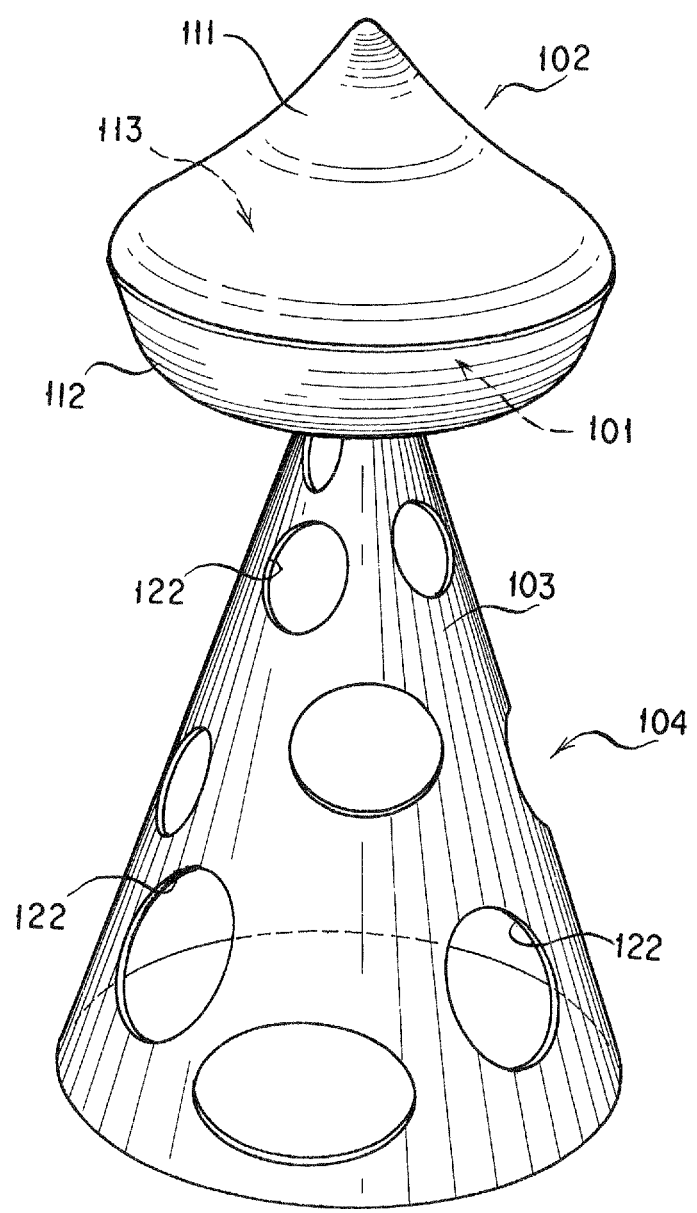
FIG. 21 is a perspective view of a still further alternative lower support member in the apparatus according to the second form of implementation of the invention.

The lower support member 104 may as shown in FIG. 18 be of a three-dimensional shape of quadrangular or triangular pyramid of which each side lace then constitutes a vertical surface portion 103. Also, as shown in FIG. 19 the side face as the surface portion 103 may be formed with a plurality of vertical slits 121, and as shown in FIGS. 20 and 21 the side face as the surface portion 103 may be formed with a plurality of holes 122.

Figure 22:
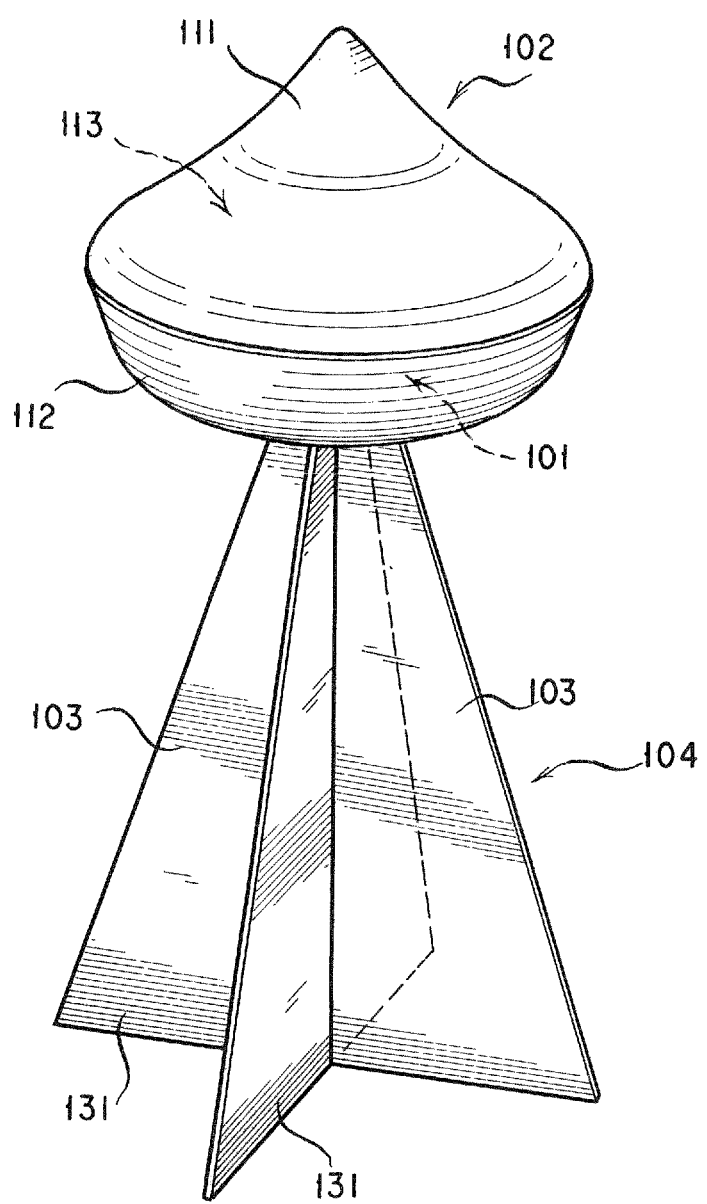
FIG. 22 is a perspective view of a yet further lower support member in the apparatus according to the second form of implementation of the invention.

Also, the lower support member 104 may not necessarily be of a three-dimensional shape of quadrangular or triangular pyramid but as shown in FIG. 22 may be of a shape such that a pair of triangular plate materials 131 are joined together so as to intersect with each other joining a cross in section. In this case, each face constitutes the vertical surface portion 103. Here, to form such a shape the plate materials joined together may not necessarily be two but may be three or more.

To mention a modification of the flying insect trapping apparatus according to the second form of implementation of the present invention, this modification is to enhance its design characteristic in case it is taken into account to place it actually in the kitchen, living room, entrance or the like of a house.

Figure 23:
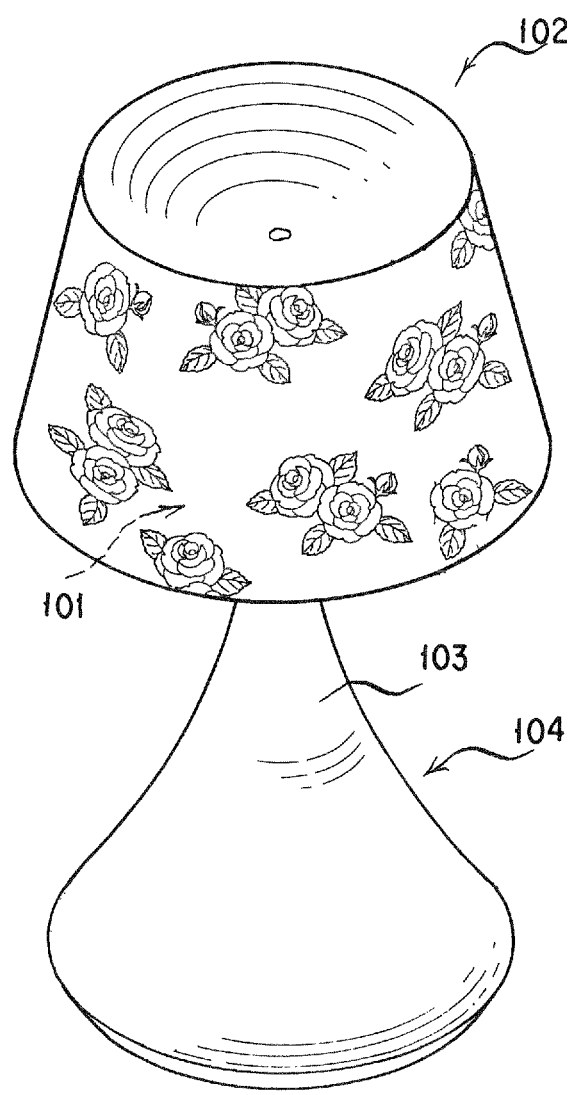
FIG. 23 is a perspective view of a modified apparatus according to the second form of implementation of the invention.
Figure 24:
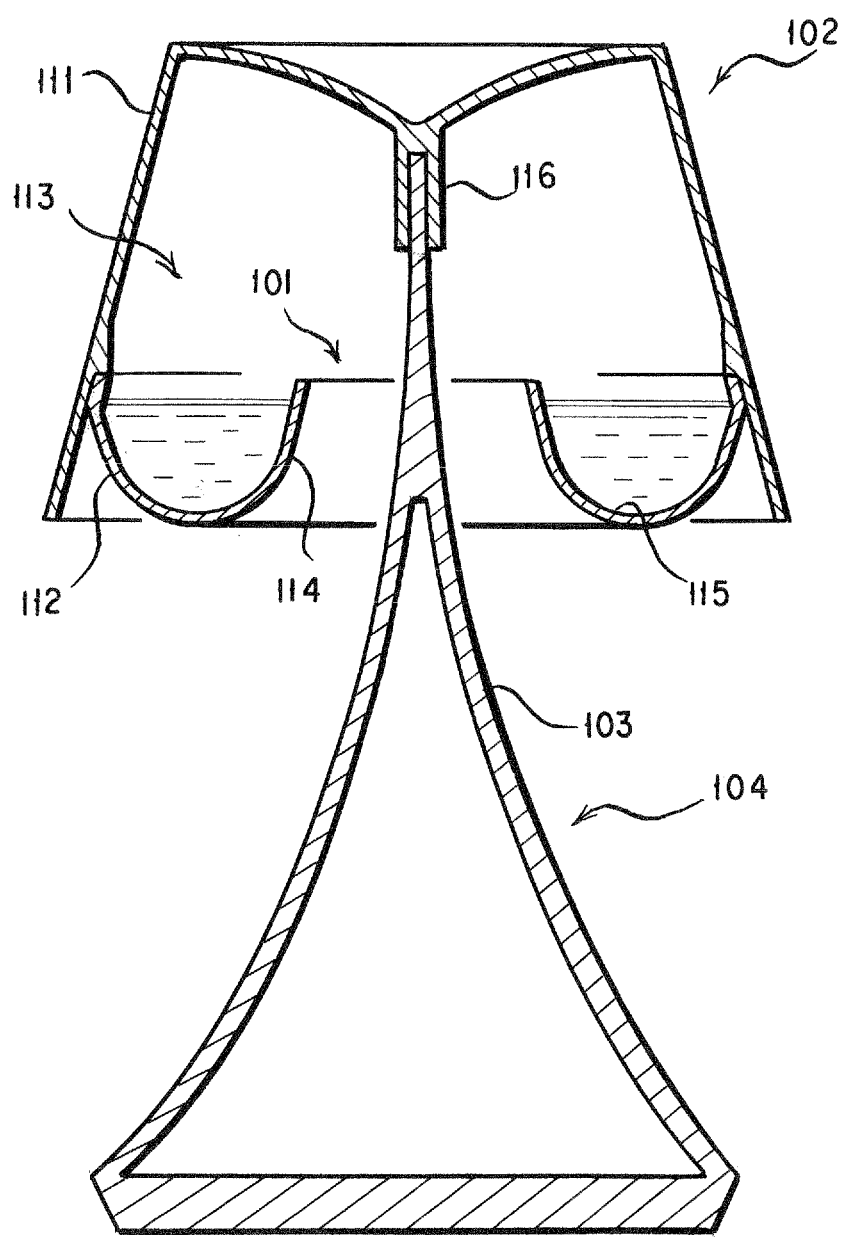
FIG. 24 is a cross sectional view of the modified apparatus according to the second form of implementation of the invention.

As shown in FIGS. 23 and 24, the upper container 102 is of a circular truncated cone in shape having a pattern such as flowers applied to its surface. On the other hand, the lower support member 104 is of a conical three-dimensional shape which is somewhat curved inwards and squeezed or narrowed down upwards.

This allows trapping flies well and drastically increasing their capture ratio and at the same time prevents the apparatus placed indoors from being recognized by the user or the like as an insect trap while making it look as a good-looking article like an ornament to decorate the room in which it is placed, thereby preventing its presence in use from giving an unpleasant feeling.

Mention is next made of a test of the flying insect trapping apparatus which was conducted.

Figure 25A:
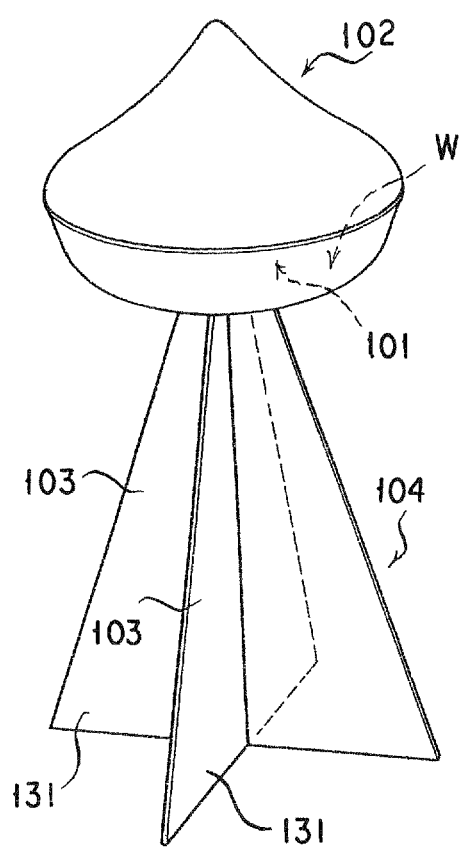
FIGS. 25A, 25B and 25C are perspective views illustrating test apparatus A, B and C, respectively, in a test.
Figure 25B:
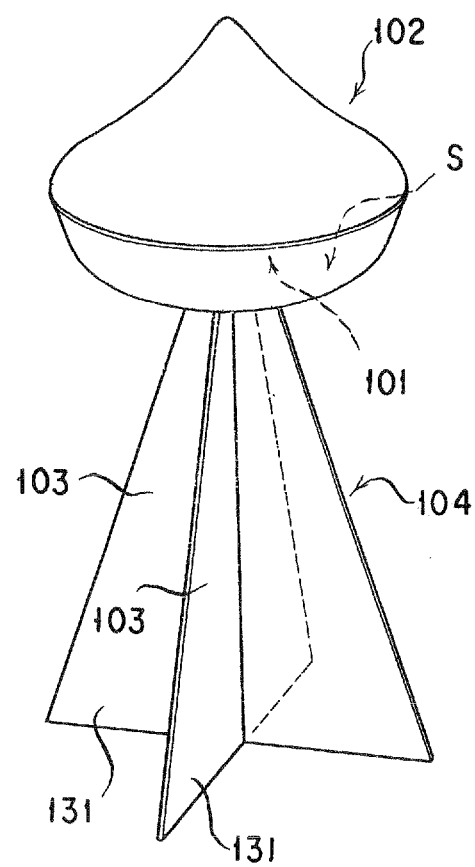
Figure 25C:
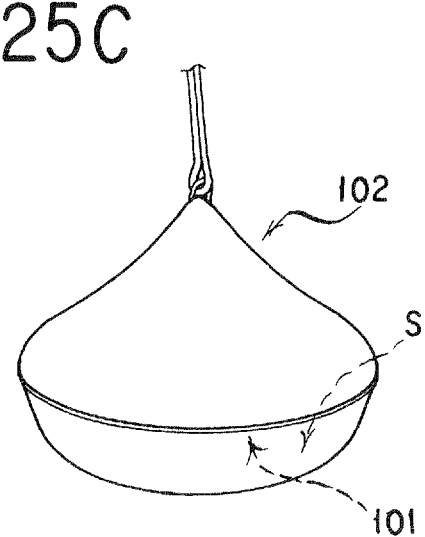
Figure 26:
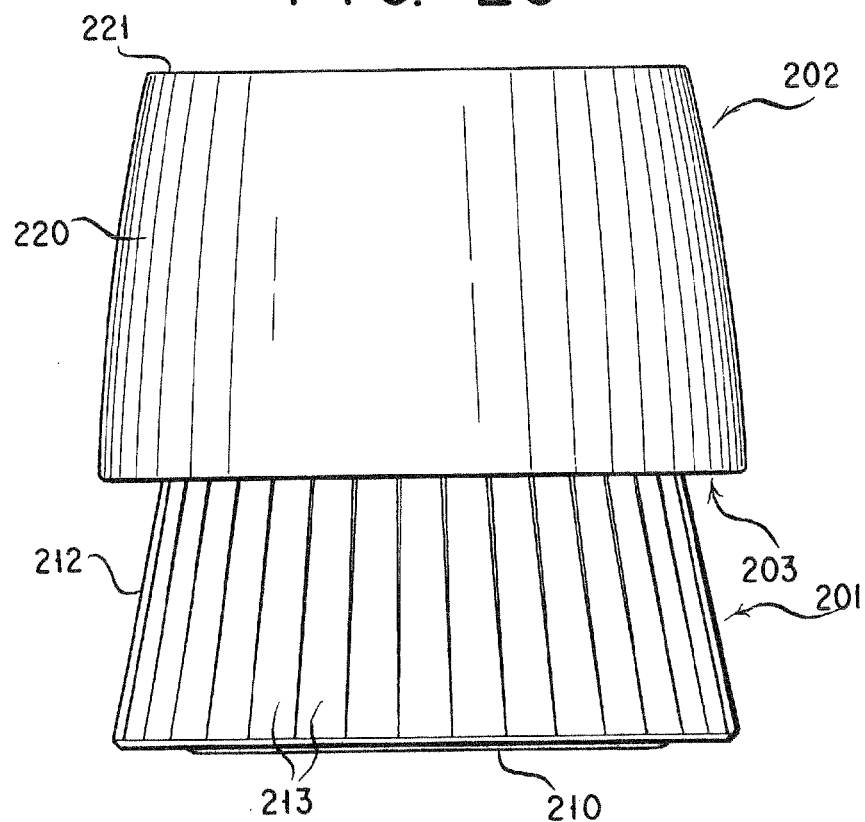
FIG. 26 is a front view of a flying insect trapping apparatus according to a third form of implementation of the present invention.
Figure 27:
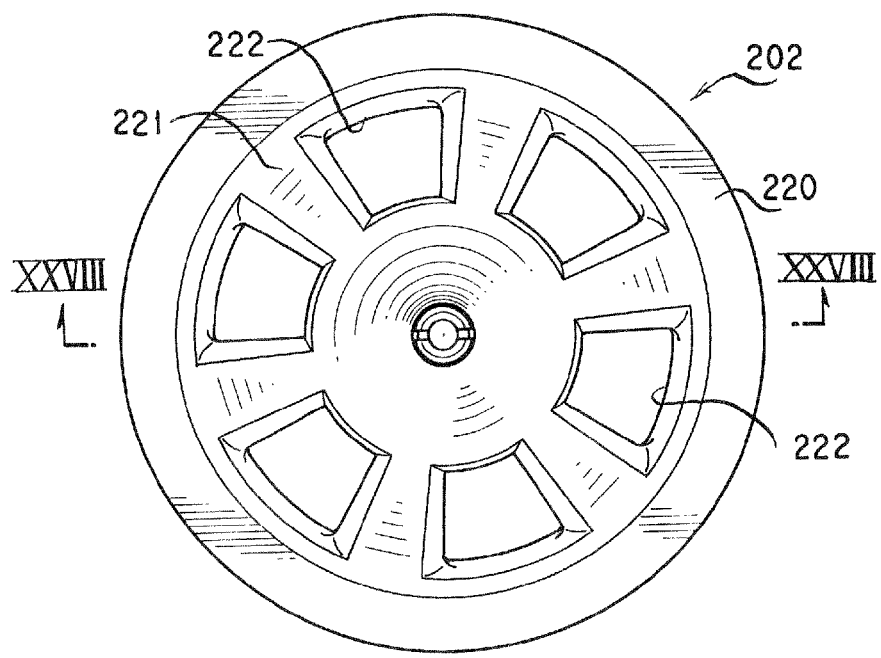
FIG. 27 is a plan view of the apparatus according to the third form of implementation of the invention.
Figure 28:
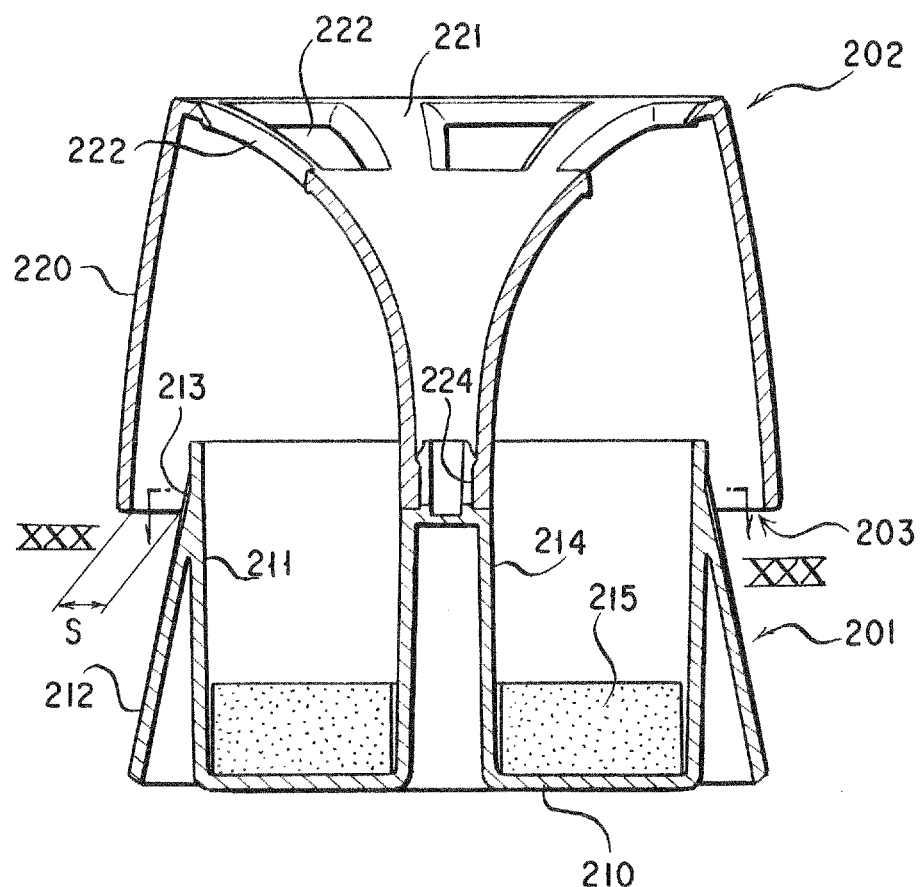
FIG. 28 is a cross sectional view of the apparatus taken along the line XXVIII-XXVIII in FIG. 27.
Figure 29:
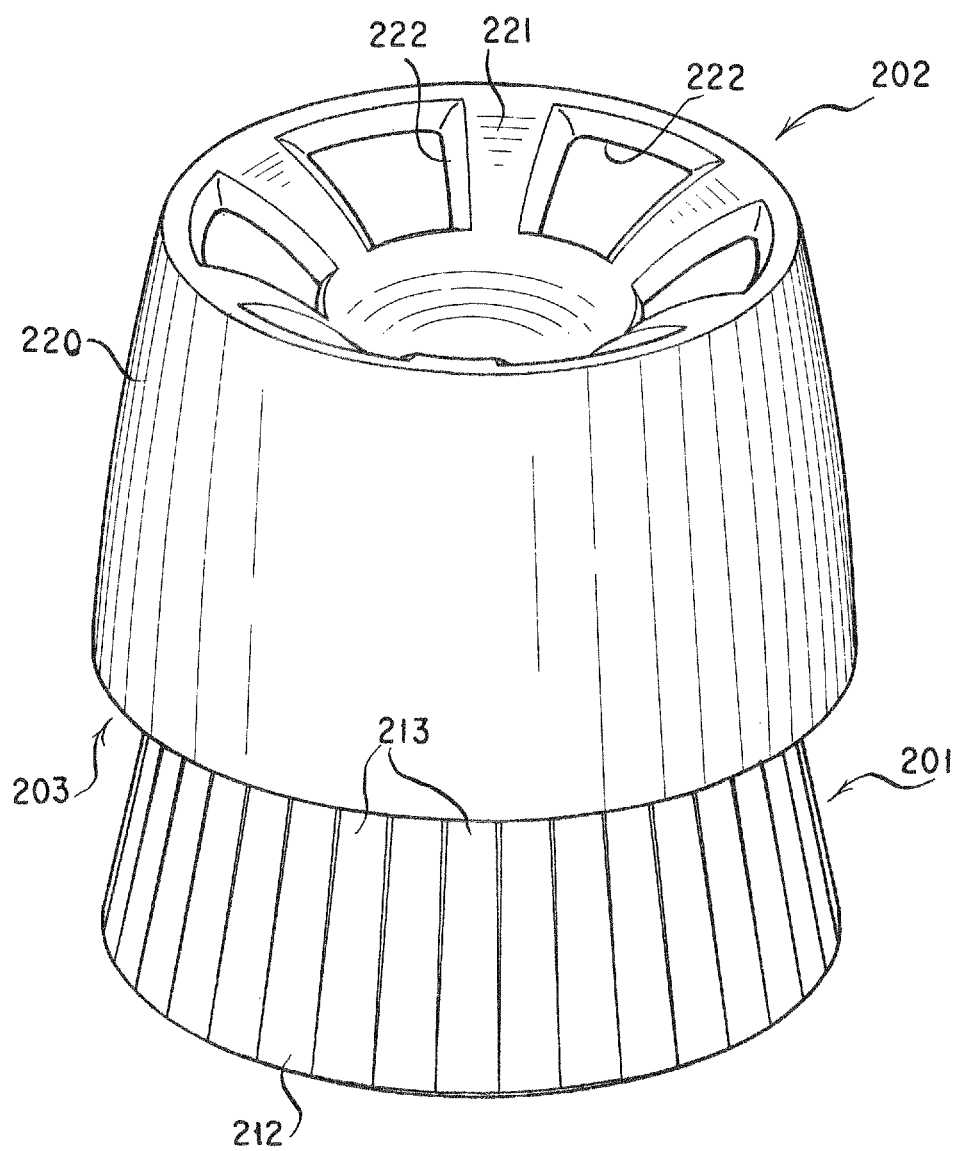
FIG. 29 is a perspective view of the apparatus according to the third form of implementation of the invention.
Figure 30:
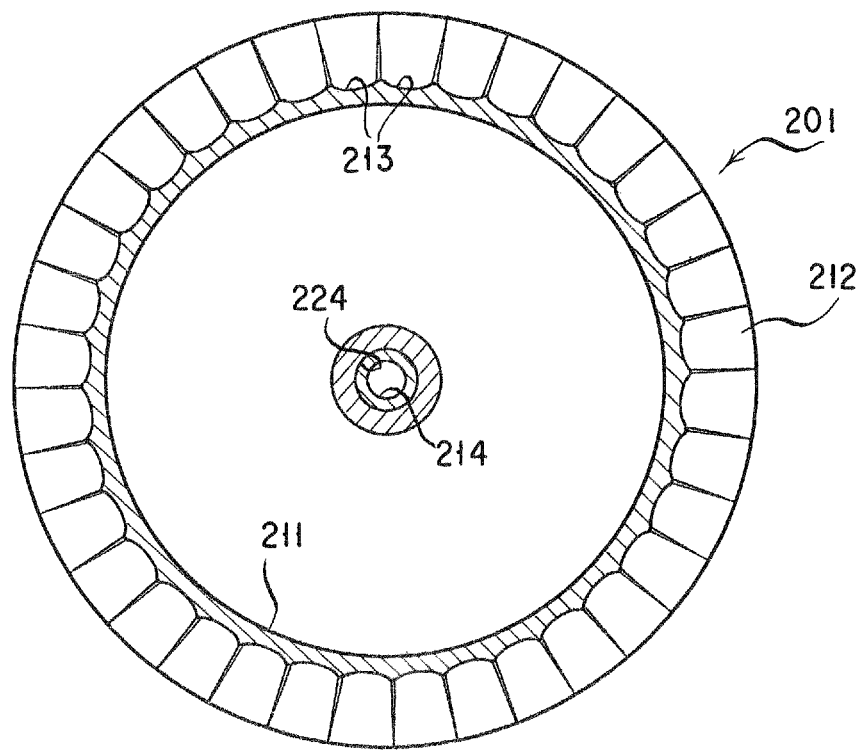
FIG. 30 is a cross sectional view of the apparatus taken along the line XXX-XXX in FIG. 28.

As this test, an exemplified apparatus A, an exemplified apparatus B and a comparative apparatus C are first prepared. The exemplified apparatus A as shown in FIG. 25A comprises an upper container 102 provided at its underside with the entry port 101 and the lower support member 104 having the vertical surface portion 103 wherein the lower support member 104 comprises two triangular plate materials 131 joined together to intersect with each other so as to form a cross in section and the recess 115 in the trap chamber 113 inside of the upper container 102 has water W received therein. The exemplified apparatus B as shown in FIG. 25B is structurally identical to but differs from the exemplified apparatus A in that the recess 115 in the trap chamber 113 inside of the upper container 102 has red vinegar S received therein as an attractant liquid. The comparative apparatus C as shown in FIG. 25C comprises the upper container 102 only which is provided at its underside with the entry port 101 and in which the recess 115 in the trap chamber 113 has red vinegar S as the attractant liquid received therein.

The exemplified apparatus A and B and the comparative apparatus C thus prepared are each disposed in a chamber (with a size of 1.82 m long, 1.82 wide and 1.82 m high) wherein the exemplified apparatus. A and B are each placed on the floor in the chamber and the comparative apparatus C is hung so that the container 102 therein lies identical in height to that of the exemplified apparatus A, B. And, 50 yellow fruit-flies were released into the inside of the chamber, and after lapse of 24 hours the respective numbers of flies trapped in trapped in the test apparatus A to C, namely capture numbers, were counted. Results of the test are shown in Table 7 below.

TABLE 7

|  | Capture Number |
| --- | --- |
| Exemplified Apparatus A | 16 |
| Exemplified Apparatus B | 23 |
| Comparative Apparatus C | 2 |

The Table shows that the exemplified apparatus A and B as flying insect trapping apparatus of the present invention respective capture numbers of 16 and 23 while the comparative apparatus C as a conventional trapping apparatus had a capture number of 2, from which it is seen that with the exemplified apparatus A and B as flying insect trapping apparatus of the present invention it is much more effective to trap than with the comparative apparatus C. In other words, it is seen that the flying insect trapping apparatus according to the present invention is markedly higher in trapping effect than the conventional trapping apparatus that relies on the odor of an attractant liquid to attract and trap flying insects.

Mention is made of a flying insect trapping apparatus according to a third form of implementation of the present invention.

The flying insect trapping apparatus as shown in FIGS. 26, 27, 28, 29 and 30 comprises a top-open hollow columnar (cylindrical) lower container 201 and a bottom-open hollow columnar (cylindrical) upper cover 202 for mounting on the lower container 201 so as to cover above the lower container 201.

The lower container 201 includes a circular bottom wall 210, a cylindrical inner circumferential wall 211 rising vertically from the rim of the bottom wall 210 and a generally cylindrical outer circumferential wall 212 connected to an upper end of the inner circumferential wall 211 and disposed outside of the inner circumferential wall 211 to serve as a vertical surface portion. To wit, the lower container 201 is largely open at its top and has the outer circumferential wall 212 over its entire side face. And, the outer circumferential wall 212 of the lower container 201 is slightly inclined inwards towards the top and provided over its entire surface with numbers of vertical grooves 213 in succession circumferentially to make the surface wavy.

Also, in the lower container 201 at a center thereof an elongate hollow-cylindrical supporting column 214 rises and on the inner bottom wall 210 is placed a chemical impregnated mat 215 in the form of a circular ring. The chemical impregnated mat 215 is e. g. of unwoven fabric and is impregnated with an attractant and an insecticide.

On the other hand, the upper cover 202 includes a cylindrical circumferential wall 220 and a top wall 221 provided at the upper end of the circumferential wall 220. To wit, the upper cover 202 is largely open at its bottom. And, the circumferential wall 220 of the upper cover 202 is slightly inclined inwards towards the top while the top wall 221 of the upper cover 202 is made in the form of a generally sunken cone and formed along its exterior with a plurality of upper entry ports 222 circumferentially. Also, at a lower center of the top wall 221 is provided a cylindrical fitting 224 that fits on the upper end of the supporting column 214 of the lower container 201.

And, the lower container 201 and the upper cover 202 are so sized that when the upper cover 202 is mounted on the lower container 201, between the lower inside of the circumferential wall 220 in the upper cover 202 and the upper outside of the outer circumferential wall 212 in the lower container 201 there is formed a horizontal spacing S over the entire outside circumference of the outer circumferential wall 212. And, this spacing S formed between the lower container 201 and the upper cover 202 is used to serve as an entry port 203 through which for flying insects to enter into the inside of the apparatus. To wit, the entry port 203 is provided extending over the entire upper outside circumference of the outer circumferential wall 212 in the lower container 201.

Here, the spacing S as the entry port 203 has a size which though varying more or less depending on flying insects to be trapped should preferably be not less than 3 to 4 mm and not more than 10 mm for flies such as small flies and not less than 10 mm and not more than 20 mm for wasps. With the spacing S so sized, flies or wasps creeping up on the outer circumferential wall 212 of the lower container 201 up to the entry port 203, then can easily enter through the entry port 203 into the inside. Flies or wasps once they enter inside will fly about in the inside and cannot exit through the entry port 203. Even if they settle on the inner circumferential wall 220 of the upper cover 202, they won't move downwards due to their negative geotaxis as will be described later and cannot exit through the entry port 203.

Also, if flies such as small flies are to be trapped, the lower container 201 and the upper cover 202 are preferably so sized that their entire height is around 100 mm, their outer diameters not less than 70 mm, the height of the lower container not less than 35 mm and the height of the outer circumferential wall 212 in the lower container 201 which is exposed and namely excludes the area where it overlaps with the upper cover 202 should be not less than 30 mm.

As the colors of the lower container 201 and the upper cover 202, the lower container 201 is made black in color and the upper cover 202 is made opaque white in color so that the inside can somewhat be seen. However, these are not a limitation, and the lower container 201 should sufficiently be of a dark color such as dark brown, black or the like while the upper cover 202 should sufficiently be of a light color such as white including opaque white.

With the apparatus components so made, if flies such as small flies are to be trapped, setting the flying insect trapping apparatus at a given indoor site such as in the kitchen will cause flies to land on the outer circumferential wall 212 of the lower container 201. Then, coloring the lower container 201 dark in color relative to the upper cover 202 made light in color can better attract flies towards the outer circumferential wall 212 of the lower container 201 to cause them to land there.

And, flies which have landed on the outer circumferential wall 212 of the lower container 201 will, by the negative geotaxis of flies or wasps, move upwards on the outer circumferential wall 212 and enter through the entry port 203 over the entire upper outside circumference of the outer circumferential wall 212 into the inside of the lower container 201 and the upper cover 202. By the negative geotaxis is here meant the nature of flying insects that they move upwards against gravity. Here, the surface of the outer circumferential wall 212 of the lower container 201 can be made wavy to further enhance the action of this negative geotaxis.

Flies which have enter into the inside of the lower container 201 and the upper cover 202 will fly about in the inside and after a while will be attracted to the chemical impregnated mat 215 placed on the inner bottom wall 210.

Thus, with this flying insect, trapping apparatus, flies present in such as the neighborhood of a kitchen can be exterminated by attracting flies into the inside of the lower container 201 and the upper cover 202 and trapping attracted flies. Moreover, with the upper cover 202 formed with the upper entry ports 222, flies can enter into the inside through these upper entry ports 222 and can be trapped through them as well.

Thus, with the apparatus made of a lower container 201 and an upper cover 202, providing an outer circumferential wall 212 over its entire side circumference of the lower container 201 while providing the outer circumferential wall 212 with an entry port 203 over its entire upper outside circumference makes it possible to cause flies landing on the outer circumferential wall 212 of the lower container 201 to move upwards on the outer circumferential wall 212 utilizing the negative geotaxis of a flying insect and then to lead them through the entry port 203 provided over the entire upper outside circumference of the outer circumferential wall 212 into an inside of the apparatus and thus to attract and trap them very well in the inside of the lower container 201 and the upper cover 202, thereby drastically increasing the capture ratio for flies.

Figure 31:
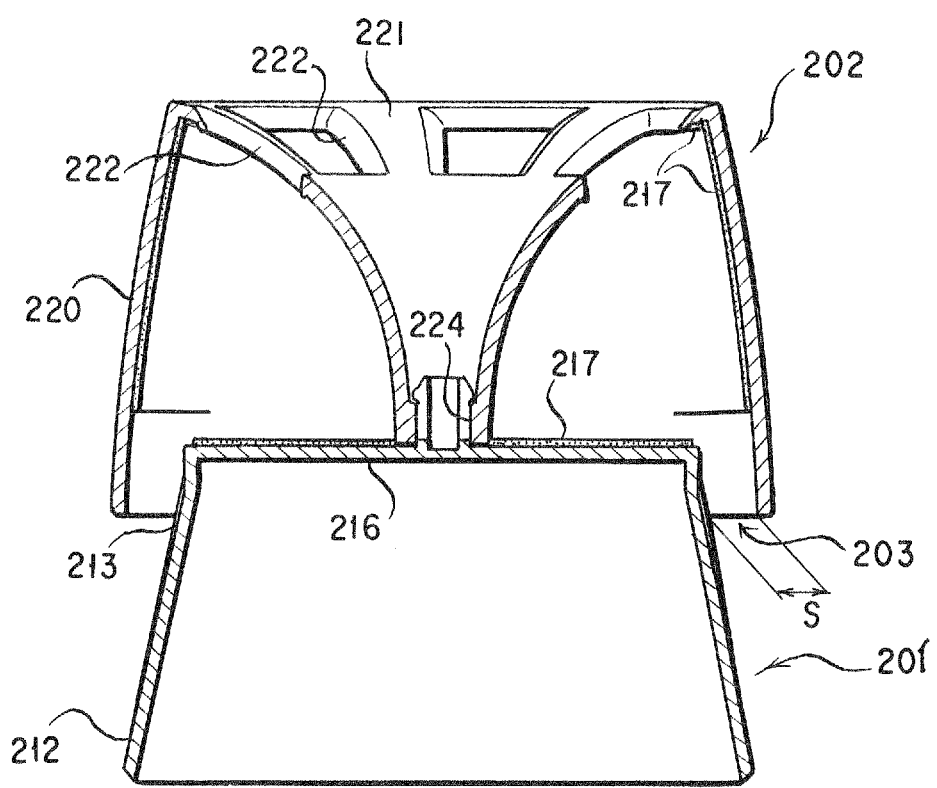
FIG. 31 is a cross sectional view illustrating a modification of internal structure of the apparatus according to the third form of implementation of the invention.
Figure 32:
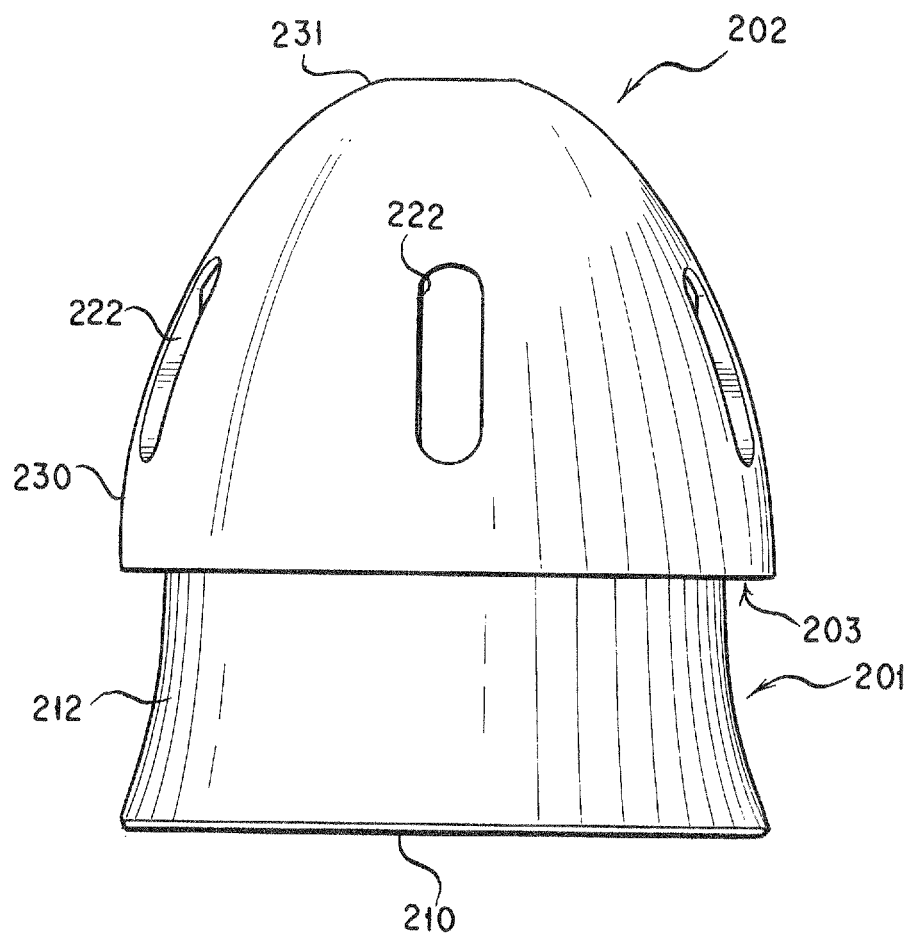
FIG. 32 is a front view of a first modified apparatus according to the third form of implementation of the invention.
Figure 33:
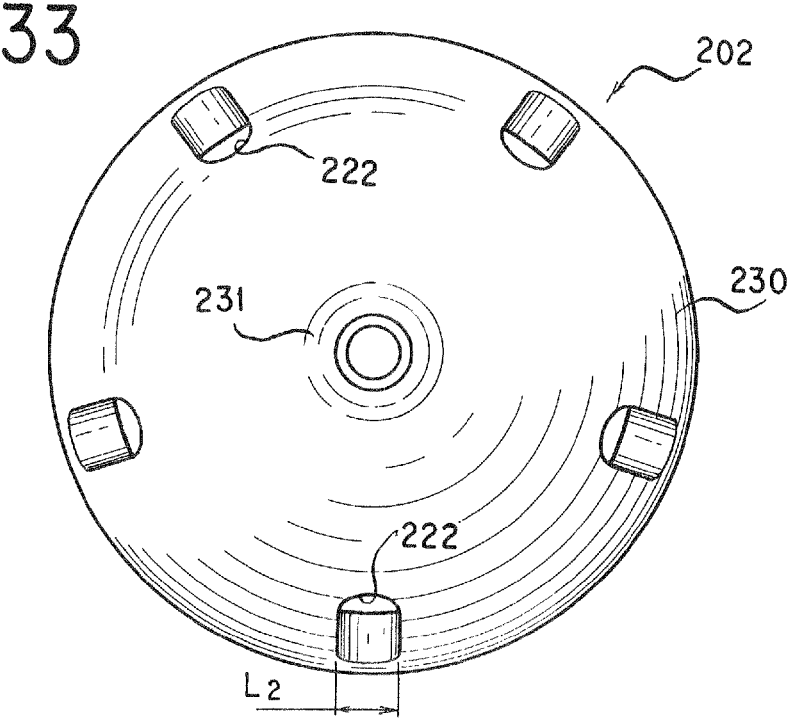
FIG. 33 is a plan view of the first modified apparatus according to the third form of implementation of the invention.
Figure 34:
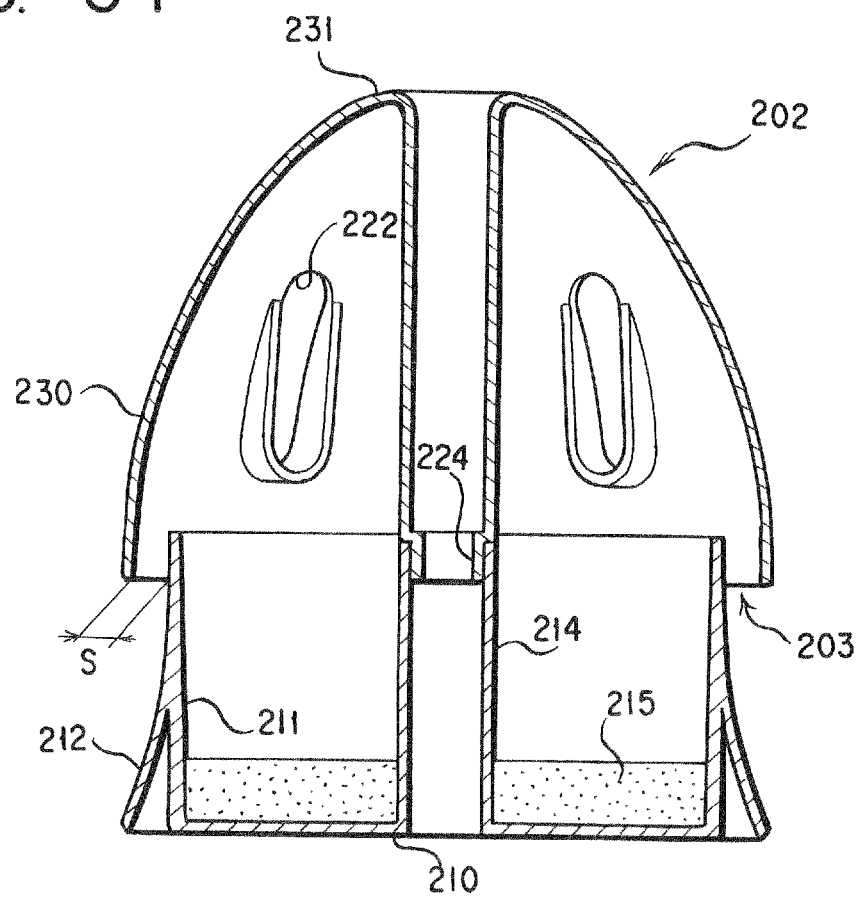
FIG. 34 is a cross sectional view of the first modified apparatus according to the third form of implementation of the invention.
Figure 35:
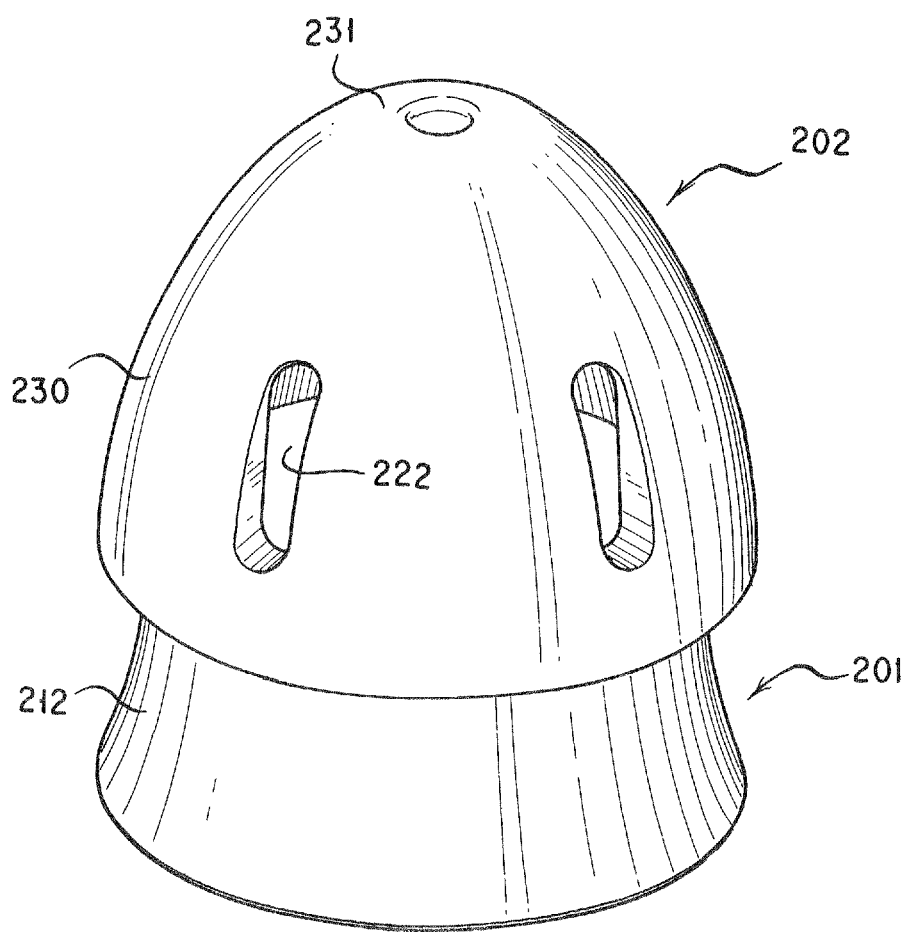
FIG. 35 is a perspective view of the first modified apparatus according to the third form of implementation of the invention.

Here, instead of placing the chemical impregnated mat 215 inside of the lower container 201, an attractant liquid or water alone may be received to cause the entered flies to be drawn, or alternatively an adhesive may be coated on a surface each of the bottom wall 210 and inner circumferential wall 211 inside of the lower container 201 to stick and trap flies therewith. Further, in a method of the type in which the adhesive is coated to trap flies by sticking, the lower container 201 may not be made of the bottom wall 210, inner circumferential wall 211 and outer circumferential wall 212 but may be made of the outer circumferential wall 212 and a top wall 216 as shown in FIG. 31 wherein an adhesive 217 may be coated on a surface of the top wall 216 and further on an inner face of each of the circumferential wall 220 and the top wall 221 of the upper cover 202 to stick and trap flies there. Here, the adhesive 217 may not entirely be coated on the circumferential wall 220 and the top wall of the upper cover but only on a portion thereof. This also applies in first to third modifications to be described below.

Mention is next made of a flying insect trapping apparatus according to a first modification of the third form of implementation of the invention.

The flying insect trapping apparatus as shown in FIGS. 32, 33, 34 and 35 and basically as in the third form of implementation above comprises a top-open lower container 201 and a bottom-open upper cover 202 for mounting on the lower container 201 so as to cover above the lower container 201.

The lower container 201 includes a circular bottom wall 210, a cylindrical inner circumferential wall 211 rising vertically from the rim of the bottom wall 210 and a generally cylindrical outer circumferential wall 212 connected to an upper end of the inner circumferential wall 211 and disposed outside of the inner circumferential wall 211 to serve as a vertical surface portion. To wit, the lower container 201 is largely open at its top and has the outer circumferential wall 212 over its entire side face. The outer circumferential wall 212 of the lower container 201 is slightly curved outwards towards the bottom in the form of an externally expanding bugle and provided over its entire surface with numbers of vertical grooves 213 in succession circumferentially to make the surface wavy.

Also, in the lower container 201 at a center thereof an elongate hollow-cylindrical supporting column 214 rises and on the inner bottom wall 210 is placed a chemical impregnated mat 215 in the form of a circular ring. The chemical impregnated mat 215 as in the third form of implementation above is e. g. of unwoven fabric and is impregnated with an attractant and an insecticide.

On the other hand, the upper cover 202 includes a circumferential side face 230 and a top face 231 which are made continuous to present a semi-ovaloidal surface. To wit, the upper cover 202 is largely open at its bottom. And, at a top center of the upper cover is provided a cylindrical fitting 224 which extending vertically downwards fits in a supporting post 224 in the lower container 201. Also, the upper cover 202 is formed in the circumferential side face 230 with five (5) upper entry ports 222 equally spaced circumferentially. Here, the upper entry ports are each around 8 mm in width L2, rejecting entry of a child finger.

And, the lower container 201 and the upper cover 202 are so sized that when the upper cover 202 is mounted on the lower container 201, between the lower inside of the circumferential side face 230 in the upper cover 202 and the upper outside of the outer circumferential wall 212 in the lower container 201 there is formed a horizontal spacing S over the entire outside circumference of the outer circumferential wall 212. And, this spacing S formed between the lower container 201 and the upper cover 202 is used to serve as an entry port 203 for flying insects to enter into the inside of the apparatus. To wit, the entry port 203 as in the third form of implementation above is provided extending over the entire upper outside circumference of the outer circumferential wall 212 in the lower container 201.

Here, the size of the spacing S as the entry port 203 and the various sizes of the lower container 201 and the upper cover 202 are equal to those in the third form of implementation above. The colors of the lower container 201 and the upper cover 202 are identical to those in the third form of implementation above.

It is thus made possible here again to cause flies landing on the outer circumferential wall 212 of the lower container 201 to move upwards on the outer circumferential wall 212 utilizing the negative geotaxis of a flying insect and then to lead them through the entry port 203 provided over the entire upper outside circumference of the outer circumferential wall 212 into an inside of the apparatus and thus to attract and trap them very well in the inside of the lower container 201 and the upper cover 202, thereby drastically increasing the capture ratio for flies.

Mention is next made of a flying insect trapping apparatus according to a second modification of the third form of implementation of the invention.

Figure 36:
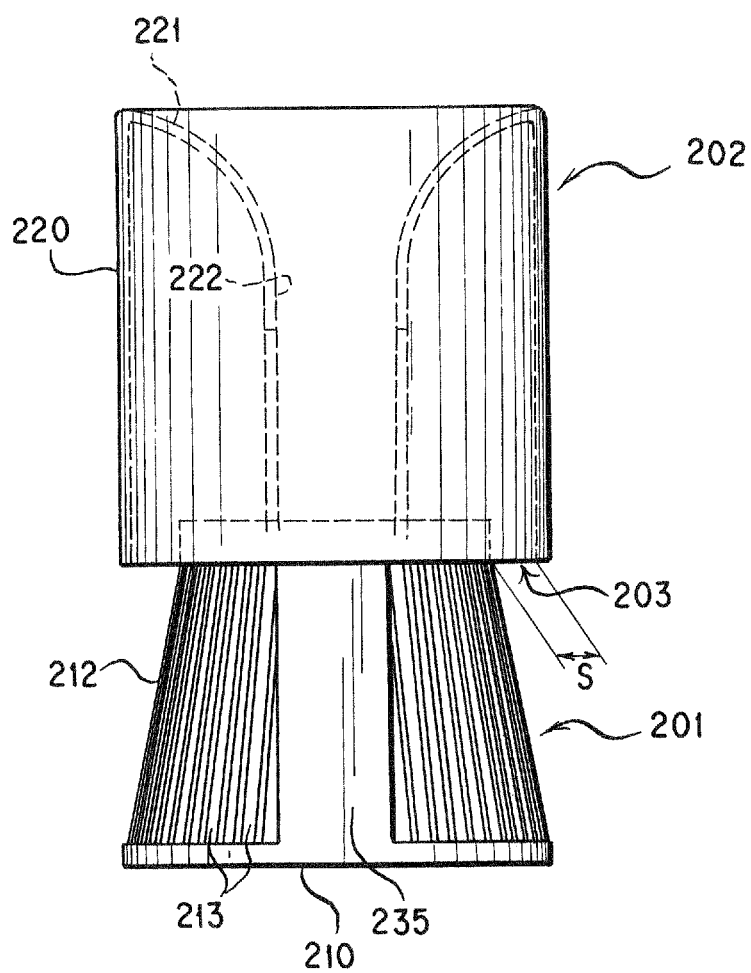
FIG. 36 is a right side view of a second modified apparatus, according to the third form of implementation of the invention.
Figure 37:
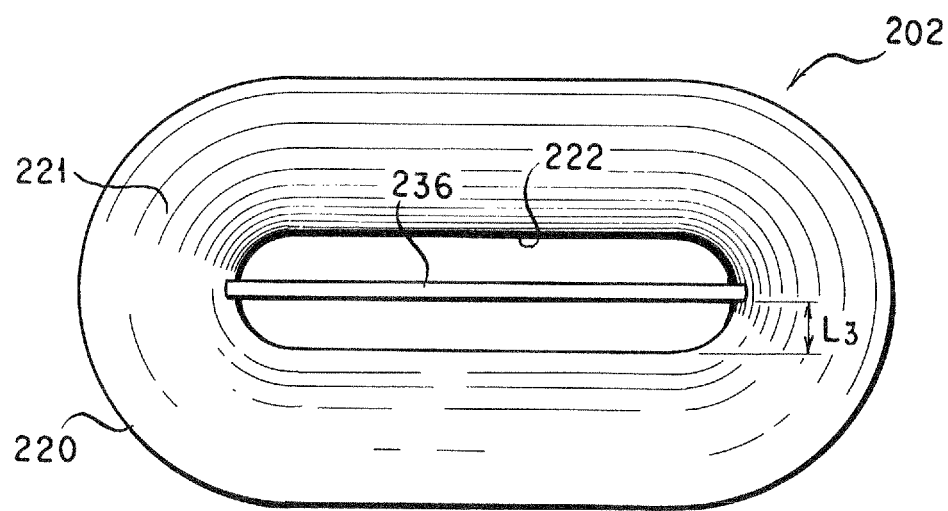
FIG. 37 is a plan view of the second modified apparatus according to the third form of implementation of the invention.
Figure 38:
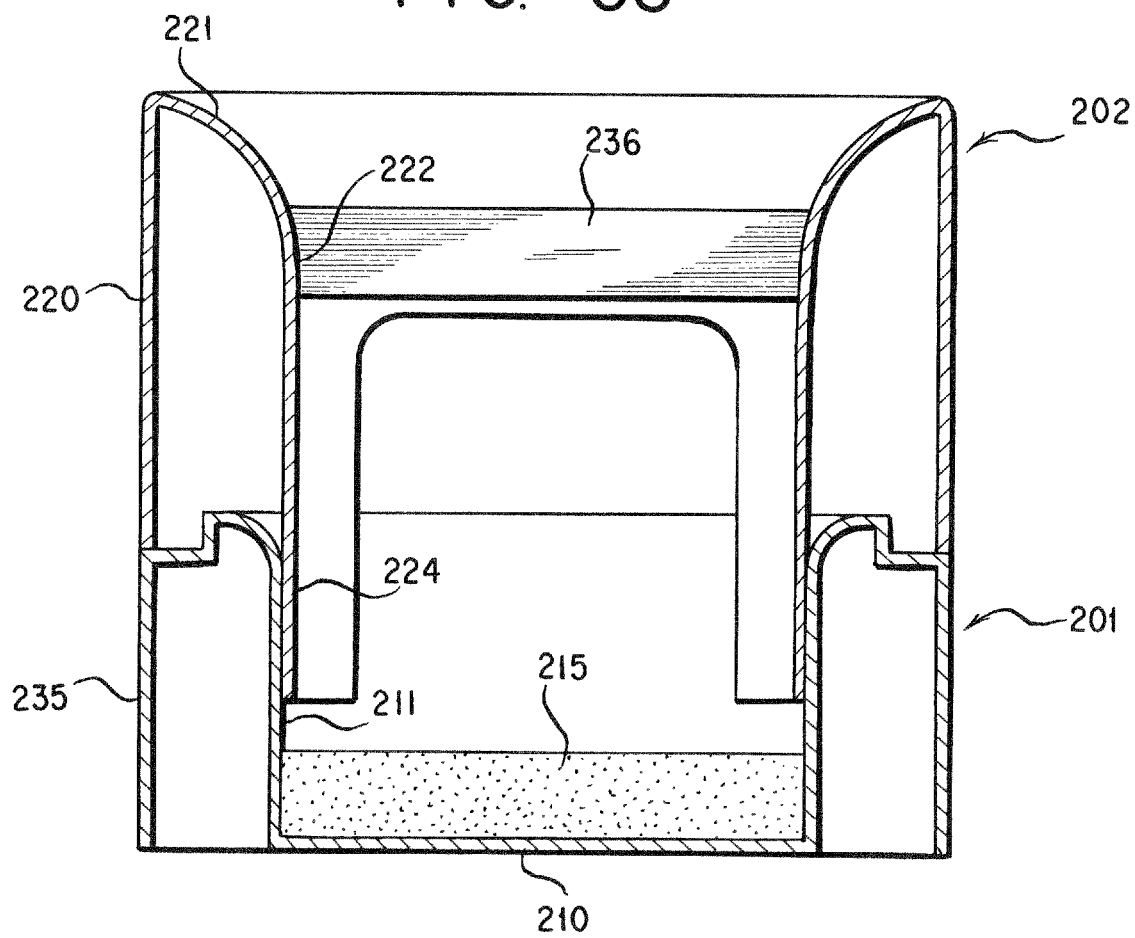
FIG. 38 is a cross sectional view of the second modified apparatus according to the third form of implementation of the invention.

The flying insect trapping apparatus according to the second modified form of implementation as shown in FIGS. 36, 37 and 38 is to make oblong cylindrical the circular cylindrical apparatus for trapping flying insects in the third form of implementation above. It comprises a top-open hollow oblong cylindrical lower container 201 and a bottom-open hollow oblong cylindrical upper cover 202 mounted on the lower container 201 so as to cover above the lower container 201.

The lower container 201 includes an oblong circular bottom wall 210, an oblong-cylindrical inner circumferential wall 211 rising up vertically from the rim of the bottom wall 210 and a generally oblong-cylindrical outer circumferential wall 212 connected to an upper end of the inner circumferential wall 211 and disposed outside of the inner circumferential wall 211 to serve as a vertical surface portion. To wit, the lower container 201 is largely open at its top and has the outer circumferential wall 212 over its entire side face. And, the outer circumferential wall 212 of the lower container 201 as in the third form of implementation above is slightly inclined inwards towards the top and provided over its entire surface with numbers of vertical grooves 213 in succession circumferentially to make the surface wavy. However, the outer circumferential wall is provided at each of its lateral or right and left sides with a vertical wall portion 235 not inclined but rising straight up.

Also, placed on the bottom wall 210 inside of the lower container 201 is an oblong-circular mat 215 impregnated with a chemical. The chemical impregnated mat 215 as in the third form of implementation above is e.g. of unwoven fabric and is impregnated with an attractant and an insecticide.

On the other hand, the upper cover 202 includes an oblong cylindrical circumferential wall 220 and a top wall 221 provided at the upper end of the circumferential wall 220. To wit, the upper cover 202 is largely open at its bottom. And, the top wall 221 of the upper cover 202 is made in the form of a generally sunken cone and has its center opened in the form of an oblong and made as an upper entry port 222. On both right and left sides of the upper entry port 222 are provided semi-circular cylindrical fittings 224 which extending downward fit respectively in right and left inside portions of the inner circumferential wall 211 in the lower container 201. Further, the lower end of the circumferential wall 220 of the upper cover 202 at its right, and left sides is designed to abut on the vertical wall portions 235 of the outer circumferential wall 212 of the lower container 201 at its right and left sides. Also, in the upper entry port. 222 a stopper plate 236 in the form of a plate is disposed oriented in a right and left direction and each of spacings L3 between its both sides and the inside of the upper entry port is not more than 8 mm, sufficient to reject entry of a child finger.

And, the lower container 201 and the upper cover 202 are so sized that when the upper cover 202 is mounted on the lower container 201, between the lower inside of the circumferential wall 220 in the upper cover 202 and the upper outside of the outer circumferential wall 212 in the lower container 201 there is formed a horizontal spacing S outside of the outer circumferential wall 212. And this spacing S formed between the lower container 201 and the upper cover 202 is used to serve as an entry port 203 through which for flying insects to enter into the inside of the apparatus. To wit, the entry port 203 as in the third form of implementation above is provided extending over the upper outside of the outer circumferential wall 212 in the lower container 201.

Here, the spacing S of the entry port 203 is sized generally as in the third form of implementation above. However, if flies such as small flies are to be trapped, the lower container 201 and the upper cover 202 are preferably so sized that their entire height is around 100 mm as in the third form of implementation above, but their length is around 55 mm back and forth and around 105 mm right and left. Making them oblong cylindrical provides a thin apparatus for trapping flying insects. Also, the colors of the lower container 201 and the upper cover 202 are equal to those in the third form of implementation above.

It is thus made possible here again to cause flies landing on the outer circumferential wall 212 of the lower container 201 to move upwards on the outer circumferential wall 212 utilizing the negative geotaxis of a flying insect and then to lead them through the entry port 203 provided over the entire upper outside circumference of the outer circumferential wall 212 into an inside of the apparatus and thus to attract and trap them very well in the inside of the lower container 201 and the upper cover 202, thereby drastically increasing the capture ratio for flies.

Mention is next made of a flying insect trapping apparatus according to a third modification of the third form of implementation of the invention.

Figure 39:
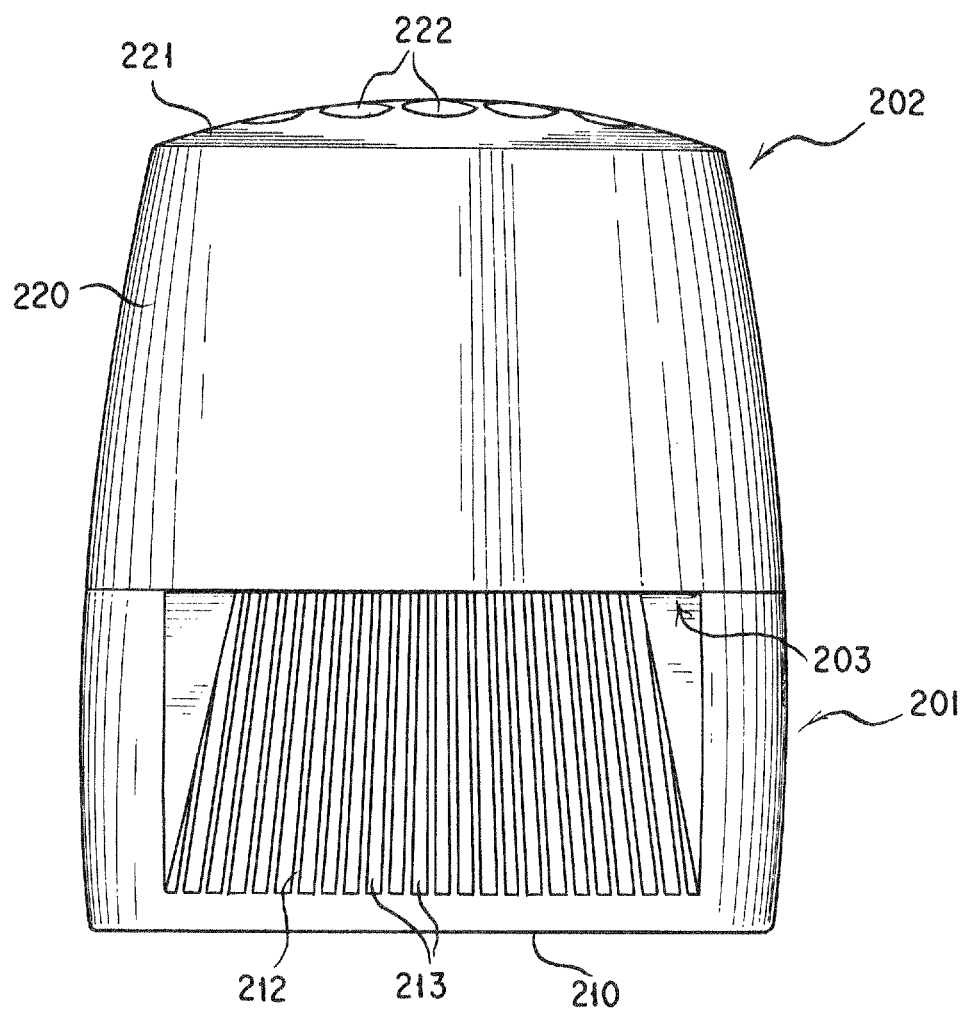
FIG. 39 is a front view of a third modified apparatus according to the third form of implementation of the invention.
Figure 40:
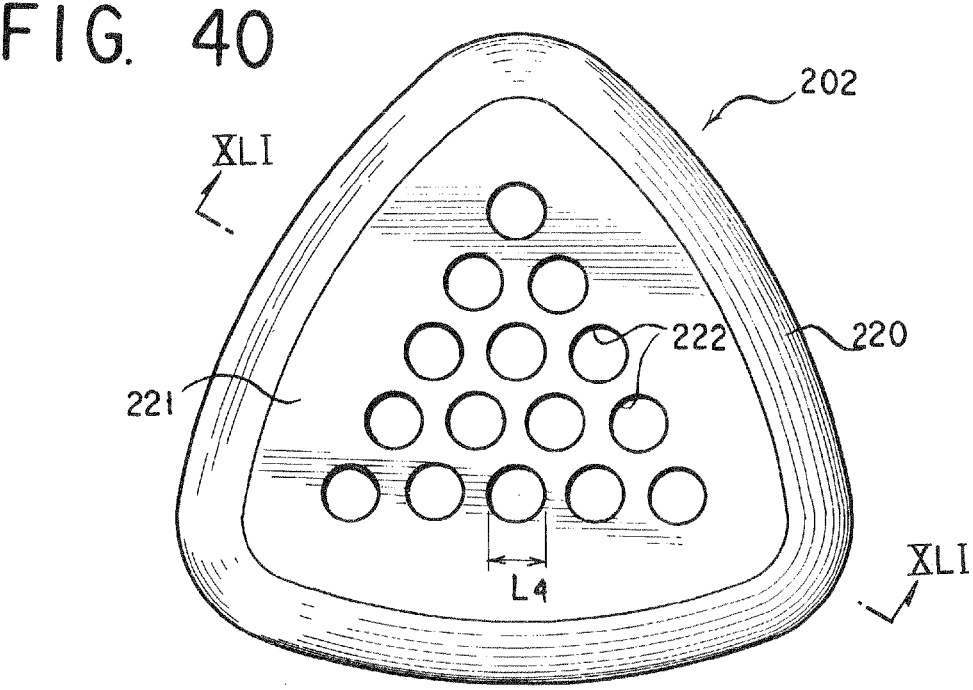
FIG. 40 is a plan view of the third modified apparatus according to the third form of implementation of the invention.
Figure 41:
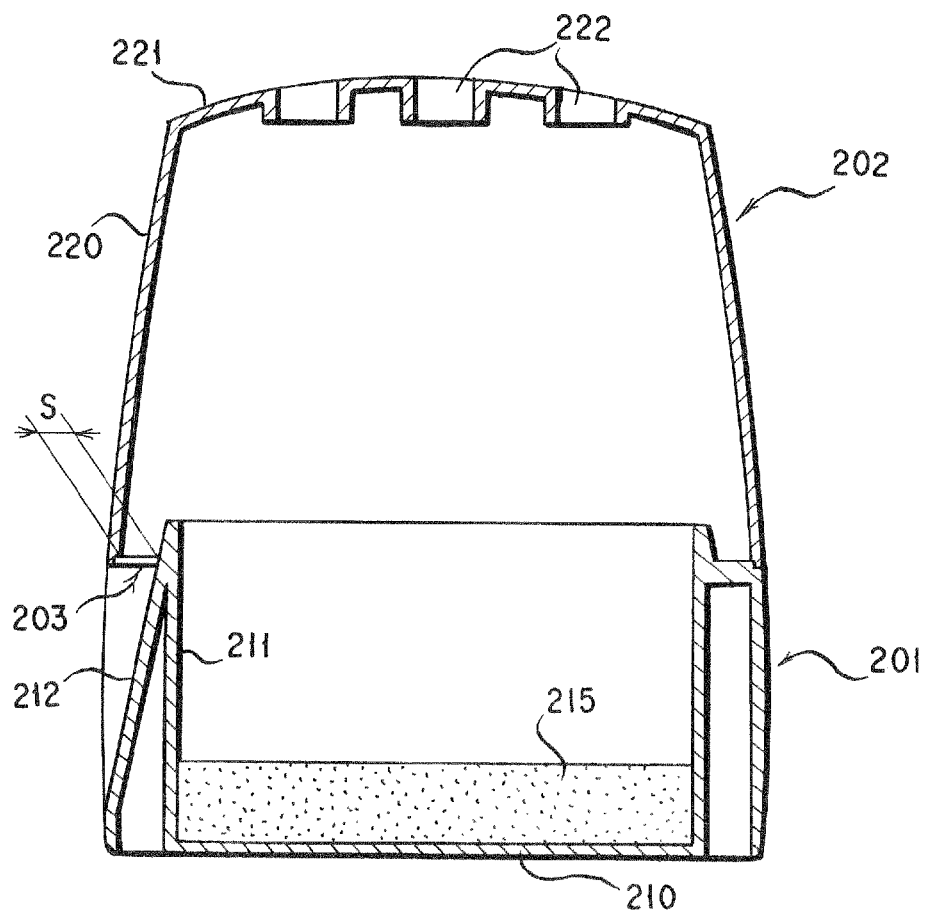
FIG. 41 is a cross sectional view of the apparatus taken along the line XLI-XLI in FIG. 40.

The flying insect trapping apparatus according to the third modified form of implementation as shown in FIGS. 39, 40 and 41 is to make triangular cylindrical the circular cylindrical apparatus for trapping flying insects in the third form of implementation above. It comprises a top-open hollow triangular cylindrical lower container 201 and a bottom-open hollow triangular cylindrical upper cover 202 mounted on the lower container 201 so as to cover above the lower container 201.

The lower container 201 includes a triangular bottom wall 210, a triangular-cylindrical inner circumferential wall 211 rising up vertically from the rim of the bottom wall 210 and a generally triangular-cylindrical outer circumferential wall 212 connected to an upper end of the inner circumferential wall 211 and disposed outside of the inner circumferential wall 211 to serve as a vertical surface portion. To wit, the lower container 201 is largely open at its top and has the outer circumferential wall 212 over its entire side face. And, the outer circumferential wall 212 of the lower container 201 which is slightly inclined inwards towards the top has three corner portions not inclined but rising straight up, and is also provided over its entire surface with numbers of vertical grooves 213 in succession circumferentially to make the surface wavy.

And, placed on the bottom wall 210 inside of the lower container 201 is a triangular mat 215 impregnated with a chemical. The chemical impregnated mat 215 as in the third form of implementation above is e. g. of unwoven fabric and is impregnated with an attractant and an insecticide.

On the other hand, the upper cover 202 includes a triangular-cylindrical circumferential wall 220 and a convex top wall 221 provided at the upper end of the circumferential wall 220. To wit, the upper cover 202 is largely open at its bottom. And, the top wall 221 of the upper cover 202 is formed with numbers of circular upper entry ports 222 whose diameter L4 is around 8 mm, sufficient to reject entry of a child finger.

To join the lower container 201 and the upper cover 202 together, while in the third form of implementation and the first modification thereof, the fitting 224 formed in the upper cover is fitted on or in the supporting post 214 rising on the lower container 201, in this modified of implementation, the three corner portions formed in the circumferential wall 220 of the upper cover 202 is fitted on the three corner portions in the outer circumferential wall 212 of the lower container 201. To join the lower container 201 and the upper cover 202 together this is not a limitation, however, in this modification in which as in the third form of implementation and the second modification thereof, there may be provided a supporting post 214 rising up in the lower container 201 and a fitting 224 in the upper cover 202 to fit thereon or therein.

And, the lower container 201 and the upper cover 202 are so sized that when the upper cover 202 is mounted on the lower container 201, between the lower inside of the circumferential wall 220 in the upper cover 202 and the upper outside of the outer circumferential wall 212 in the lower container 201 there is formed a horizontal spacing S outside of the outer circumferential wall 212 except where there are the three corner portions. And, this spacing S formed between the lower container 201 and the upper cover 202 is used to serve as an entry port 203 through which for flying insects to enter into the inside of the apparatus. To wit, the entry port 203 as in the third form of implementation above is provided extending over the upper outside of the outer circumferential wall 212 in the lower container 201.

Here, the spacing S of the entry port is sized as in the third form of implementation above. Also, the colors of the lower container 201 and the upper cover 202 are equal to those in the third form of implementation above.

It is thus made possible here again to cause flies landing on the outer circumferential wall 212 of the lower container 201 to move upwards on the outer circumferential wall 212 utilizing the negative geotaxis of a flying insect and then to lead them through the entry port 203 provided over the entire upper outside circumference of the outer circumferential wall 212 into an inside of the apparatus and thus to attract and trap them very well in the inside of the lower container 201 and the upper cover 202, thereby drastically increasing the capture ratio for flies.

Mention is next made of tests on trapping effects of the flying insect trapping apparatus according to the present invention.

Figure 42A:
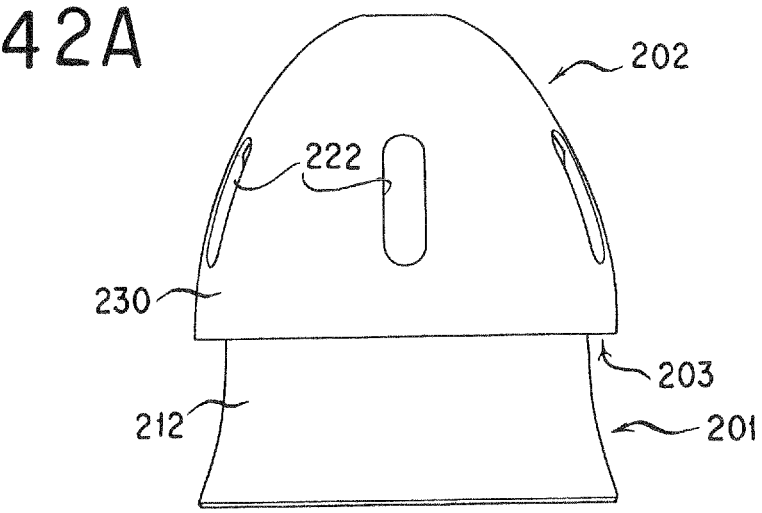
FIGS. 42A to 42C are explanatory views illustrating tests, respectively, in the present invention.
Figure 42B:
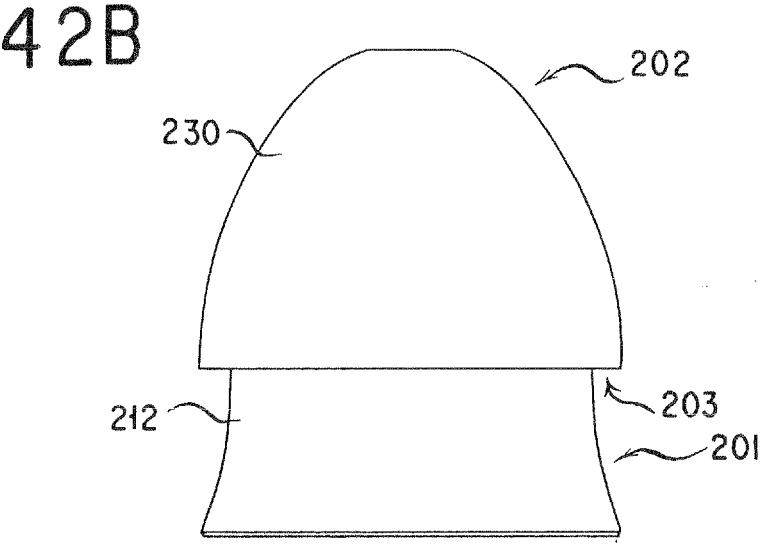
Figure 42C:
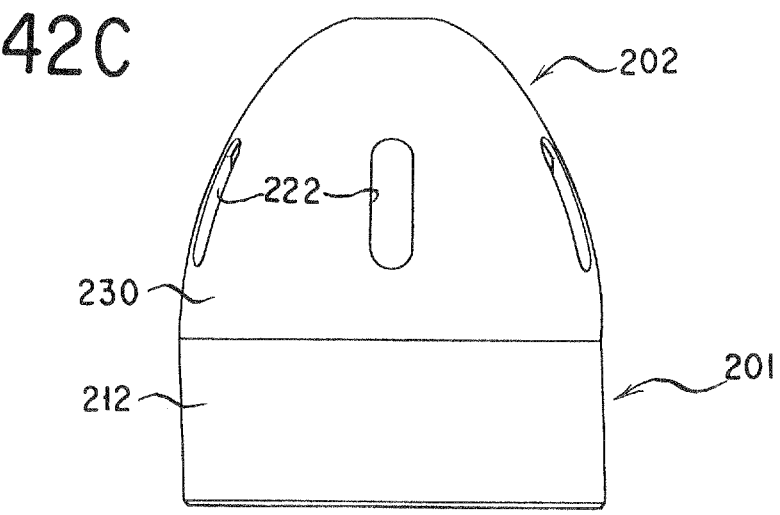

In tests, use is made of three types A, B and C of the flying insect trapping apparatus as shown in FIGS. 42A, 42B and 42C, respectively. A is a flying insect trapping apparatus as described in the first modification above, B is a flying insect trapping apparatus which eliminates the upper entry ports 222 provided in the circumferential side face of the upper cover 202 in the apparatus A, and C is a flying insect trapping apparatus which eliminates the entry port 203 provided over the entire upper outside circumference in the outer circumferential wall 212 of the lower container 201 in the apparatus A.

Each of the test apparatus A, B and C was suspended from the ceiling of a chamber (with a size of 1.82 m long, 1.82 wide and 1.82 in high) into which 50 small flies were released, and after lapse of 24 hours the respective numbers of flies trapped in the test apparatus A, B and C, namely capture numbers, were counted. After these tests were each repeated more than once, the average capture numbers were calculated. Results of the test are shown in Table 8 below.

TABLE 8

|  | Average Capture Number |
| --- | --- |
| Apparatus A | 22 |
| Apparatus B | 18 |
| Apparatus C | 6 |

It is shown that the flying insect trapping apparatuses A, B and C had average capture numbers of 22, 18 and 6, respectively. These average capture numbers taken together are shown in FIG. 43 in a circular graph form.

Figure 43:
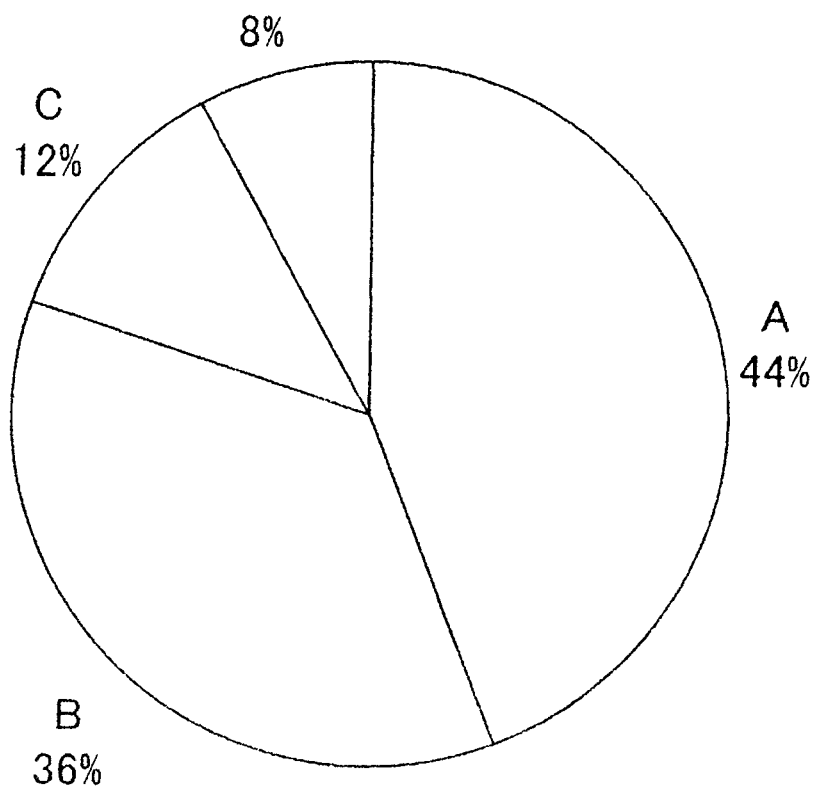
FIG. 43 shows the average capture numbers of the flying insect trapping apparatuses A, B, and C, shown in FIGS. 42A-42C, in a circular graph form.

As is apparent from FIG. 43, the flying insect trapping apparatuses A and B trap 44% and 36% of the total, respectively, while the flying insect trapping apparatus C only traps 12% of the total.

From these results, it is seen that it is extremely high in small fly capture number if the entry port 203 is provided over the entire upper outside circumference of the outer circumferential wall 212 in the lower container 201, the entry port 203 achieving a notable effect in capture. It is also seen that providing the upper cover 202 with upper entry ports further increases the capture number.

What is claimed is:

1. A flying insect trapping apparatus comprising:
an attractive and inductive member having a vertical surface portion;
an entry port surrounding an upper part of the attractive and inductive member;
a trap chamber communicating with the entry port, wherein the attractive and inductive member is adapted to attract a flying insect and induce the flying insect to land on said vertical surface portion and move upwards along the vertical surface portion due to a negative geotaxis of the flying insect, and to pass through said entry port so as to be trapped inside said trap chamber;
a lower container serving as the attractive and inductive member, wherein an entire side circumference of the lower container is formed with an outer circumferential wall as the vertical surface portion;
an upper cover which is mounted on the lower container so as to cover the lower container, and which is open at a bottom thereof;
a horizontal spacing formed between an upper outside of the outer circumferential wall of the lower container and a lower inside of the upper cover, as the entry port for the flying insect to enter;
a cylindrical fitting which is provided at a lower center of a top wall of the upper cover and which extends vertically downwards to a vicinity of a lower end position of the upper cover so as to be substantially level with the lower end position of the upper cover; and
an elongated hollow-cylindrical supporting column which is provided in the lower container so as to rise from a center of the lower container,
wherein the cylindrical fitting of the upper cover engages an upper end of the supporting column of the lower container.

2. The flying insect trapping apparatus as set forth in claim 1, wherein said entry port is provided over an entire upper outside circumference of the outer circumferential wall of the lower container.

3. The flying insect trapping apparatus as set forth in claim 2, wherein the trap chamber is formed inside at least one of said lower container and upper cover.

4. The flying insect trapping apparatus as set forth in claim 1, wherein the trap chamber is formed inside at least one of said lower container and upper cover.

5. The flying insect trapping apparatus as set forth in claim 1, wherein the lower container is a top-open hollow columnar lower container, and the upper cover is a bottom-open hollow columnar upper cover for mounting on the lower container, wherein the lower container and the upper cover are cylindrical and define the trap chamber therebetween.

6. The flying insect trapping apparatus as set forth in claim 1, wherein the lower container includes a circular bottom wall and a cylindrical inner circumferential wall rising vertically from the bottom wall, and wherein the outer circumferential wall of the lower container is connected to an upper end of the inner circumferential wall and disposed outside the inner circumferential wall so as to serve as the vertical surface portion.

7. The flying insect trapping apparatus as set forth in claim 6, further comprising a chemical impregnated mat which is placed inside the trap chamber on the circular bottom wall.

8. The flying insect trapping apparatus as set forth in claim 1, wherein the outer circumferential wall of the lower container is provided with a plurality of vertical grooves over an entire circumferential surface thereof to make a surface of the outer circumferential wall wavy.

9. The flying insect trapping apparatus as set forth in claim 1, wherein the upper cover includes a cylindrical circumferential wall, and the top wall of the upper cover is provided at an upper end of the cylindrical circumferential wall.

10. The flying insect trapping apparatus as set forth in claim 9, wherein the top wall of the upper cover has a plurality of upper entry ports along an exterior thereof.

* * * * *